United States Patent
Ukita et al.

(10) Patent No.: US 9,035,598 B2
(45) Date of Patent: May 19, 2015

(54) ELECTRICAL CHARGING/DISCHARGING CONTROL APPARATUS, ELECTRIC-POWER MANAGEMENT APPARATUS, ELECTRIC-POWER MANAGEMENT METHOD AND ELECTRIC-POWER MANAGEMENT SYSTEM

(75) Inventors: Masakazu Ukita, Kanagawa (JP); Asami Yoshida, Kanagawa (JP); Shiho Moriai, Kanagawa (JP); Masanobu Katagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 549 days.

(21) Appl. No.: 13/402,380

(22) Filed: Feb. 22, 2012

(65) Prior Publication Data

US 2012/0249056 A1    Oct. 4, 2012

(30) Foreign Application Priority Data

Mar. 30, 2011  (JP) ................................. 2011-073974

(51) Int. Cl.
```
H02J 7/00       (2006.01)
G01R 11/56      (2006.01)
G05D 3/12       (2006.01)
G05B 19/18      (2006.01)
H02J 3/32       (2006.01)
H02J 3/00       (2006.01)
G06Q 30/06      (2012.01)
G06Q 50/06      (2012.01)
H02J 3/14       (2006.01)
```

(52) U.S. Cl.
CPC . *H02J 3/32* (2013.01); *H02J 3/008* (2013.01); *Y04S 50/10* (2013.01); *H02J 2003/146* (2013.01); *G06Q 30/06* (2013.01); *G06Q 50/06* (2013.01)

(58) Field of Classification Search
CPC ...................................................... G06Q 30/02
USPC ............ 320/107; 705/412, 295, 7; 700/7, 295
See application file for complete search history.

(56) References Cited

U.S. PATENT DOCUMENTS 6,021,402 A  *  2/2000  Takriti ........................ 705/412
6,557,007 B1 *  4/2003  Pekowski et al. ............. 705/37
8,772,961 B2 *  7/2014  Ichikawa ..................... 307/9.1

(Continued)

FOREIGN PATENT DOCUMENTS

JP    2002-233053    8/2002
JP    2010-081722    4/2010

OTHER PUBLICATIONS

European Search Report mailed Jul. 25, 2012 for EP 12001473.3-2210 for Sony Corporation from the European Patent Office.

*Primary Examiner* — M'Baye Diao
(74) *Attorney, Agent, or Firm* — Sherr & Jiang, PLLC

(57) ABSTRACT

Disclosed herein is an electrical-charging/discharging control apparatus composing an electric-power accumulation facility in conjunction with an electric-power accumulation battery and including: a communication section configured to receive a command to carry out either of electrical charging and discharging operations on the electric-power accumulation battery from an electric-power management apparatus for managing the electrical charging and discharging operations carried out on the electric-power accumulation battery; a control section configured to control the electrical charging and discharging operations carried out on the electric-power accumulation battery on the basis of the command; and a power conditioner for supplying electric power from an electric-power network to the electric-power accumulation battery and transferring electric power accumulated in the electric-power accumulation battery to the electric-power network in accordance with control carried out by the control section.

15 Claims, 9 Drawing Sheets

(56) References Cited

U.S. PATENT DOCUMENTS

| | | |
|---|---|---|
| 2004/0249516 A1 | 12/2004 | Seto et al. |
| 2008/0294472 A1* | 11/2008 | Yamada ............................ 705/7 |
| 2009/0040029 A1 | 2/2009 | Bridges et al. |
| 2010/0138066 A1 | 6/2010 | Kong |

* cited by examiner

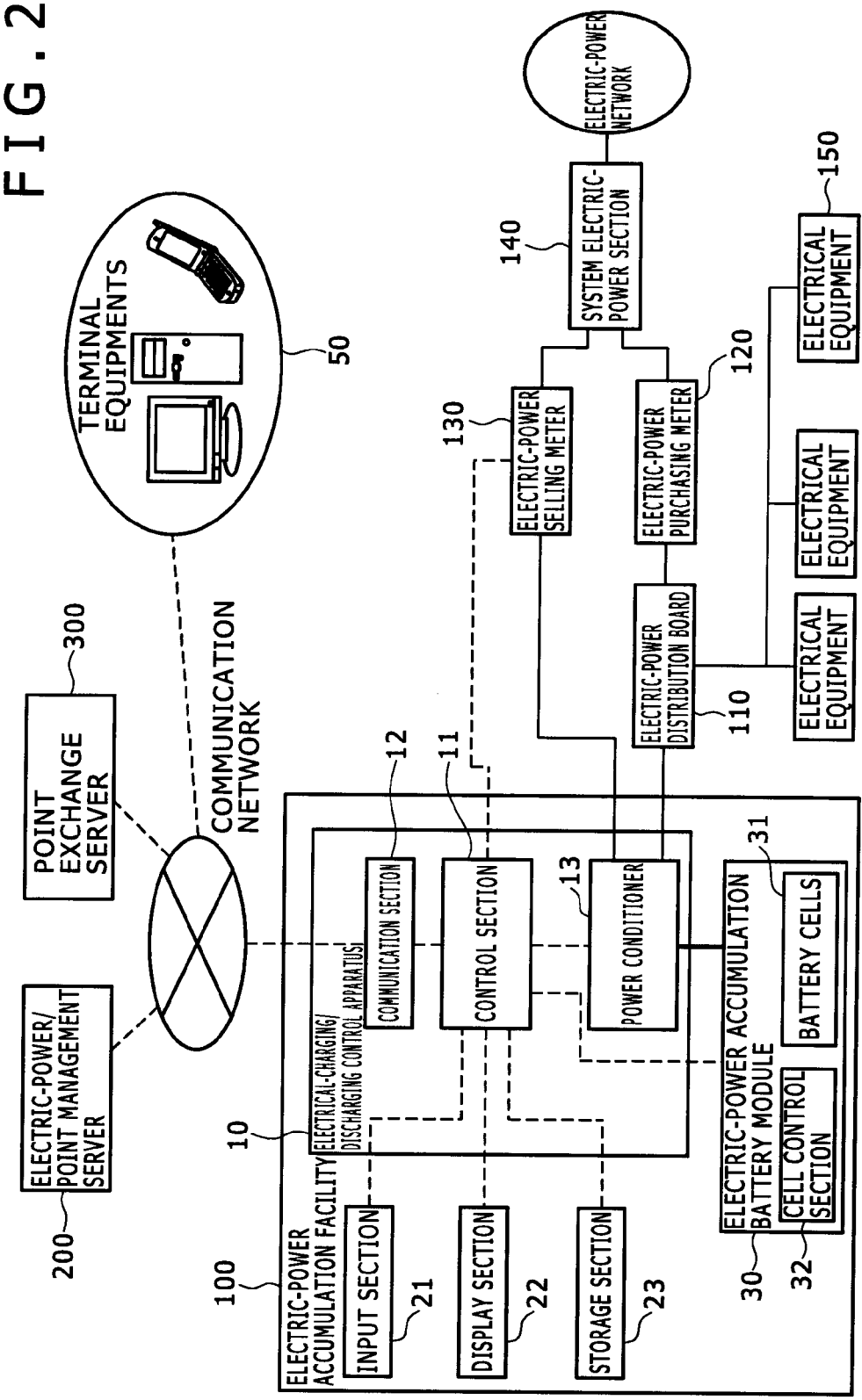

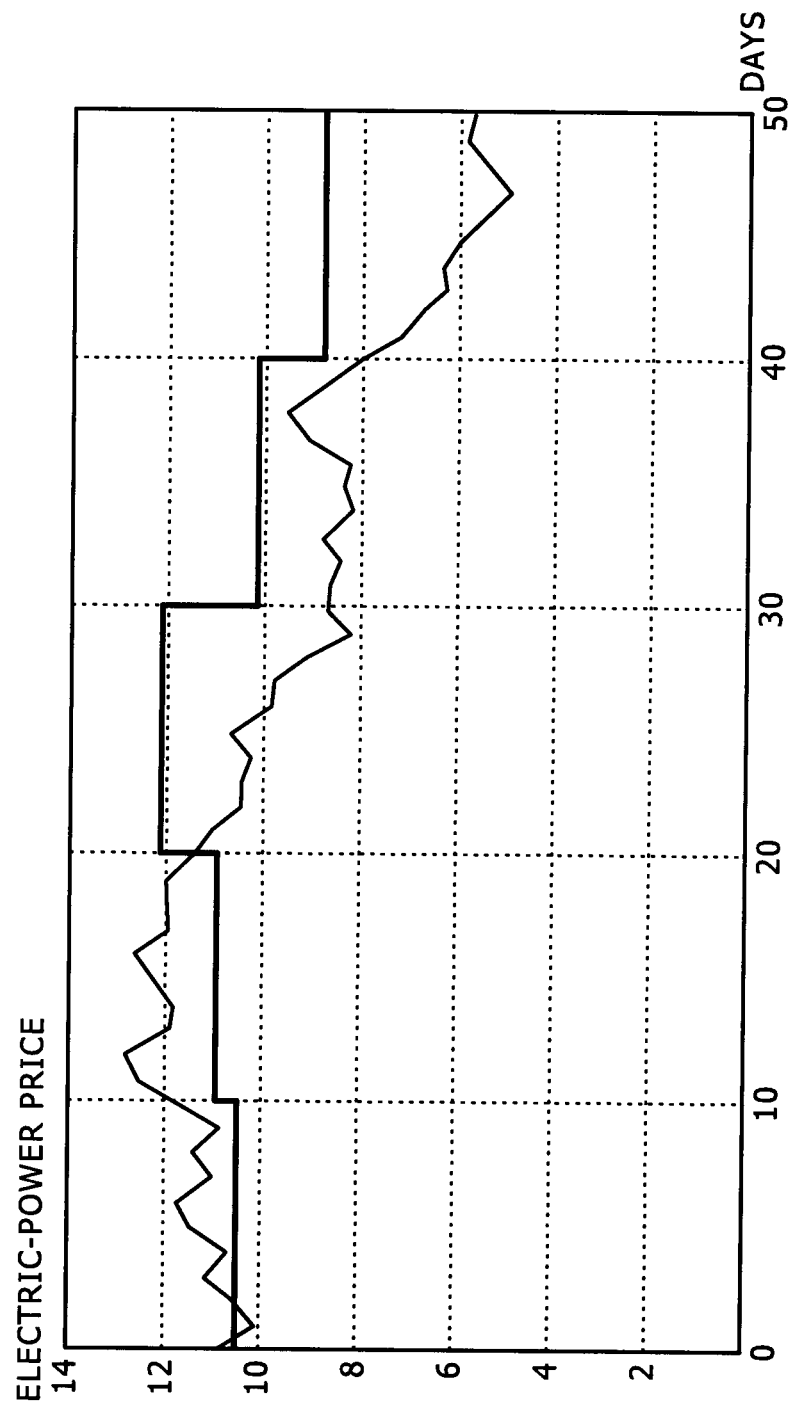

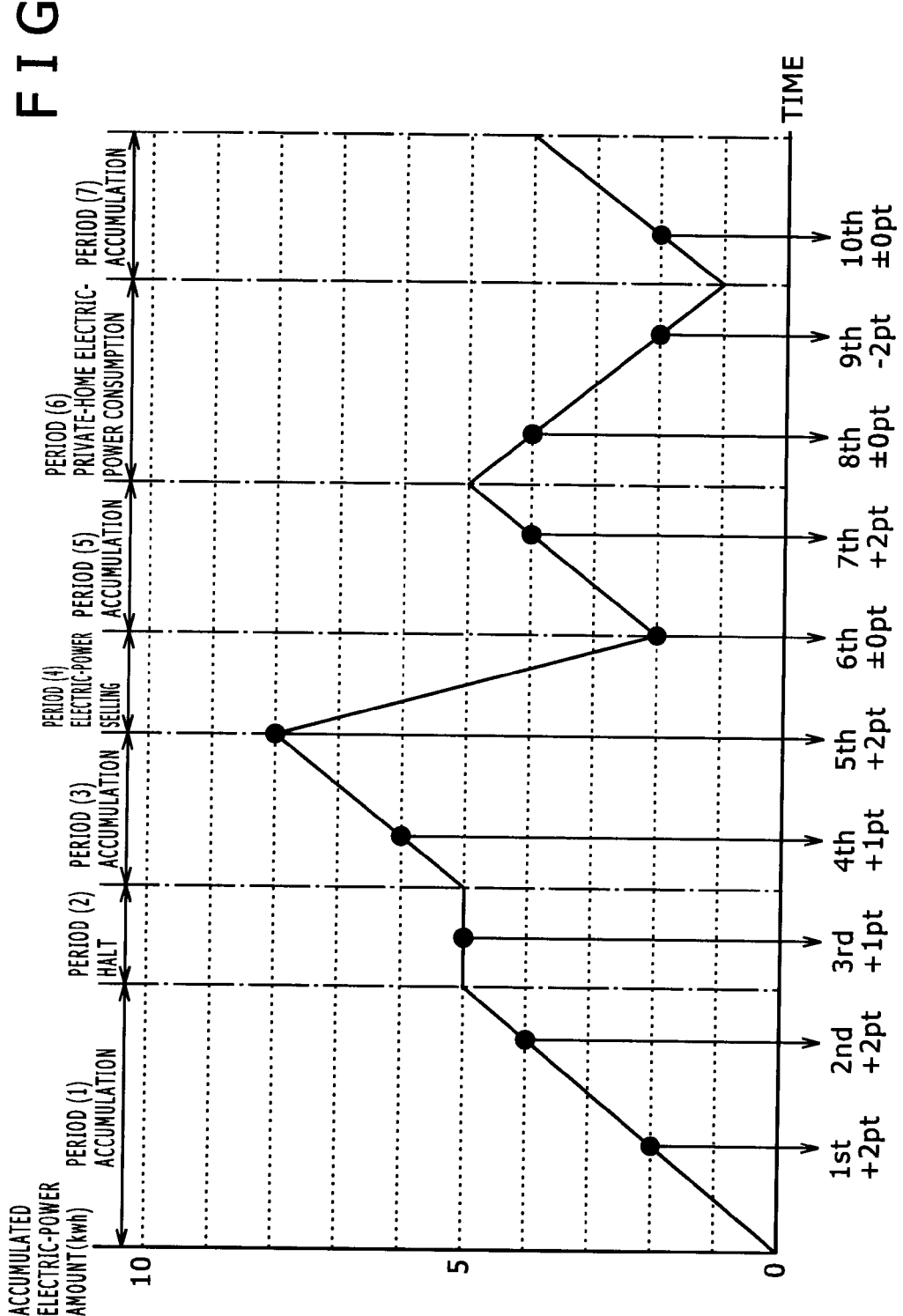

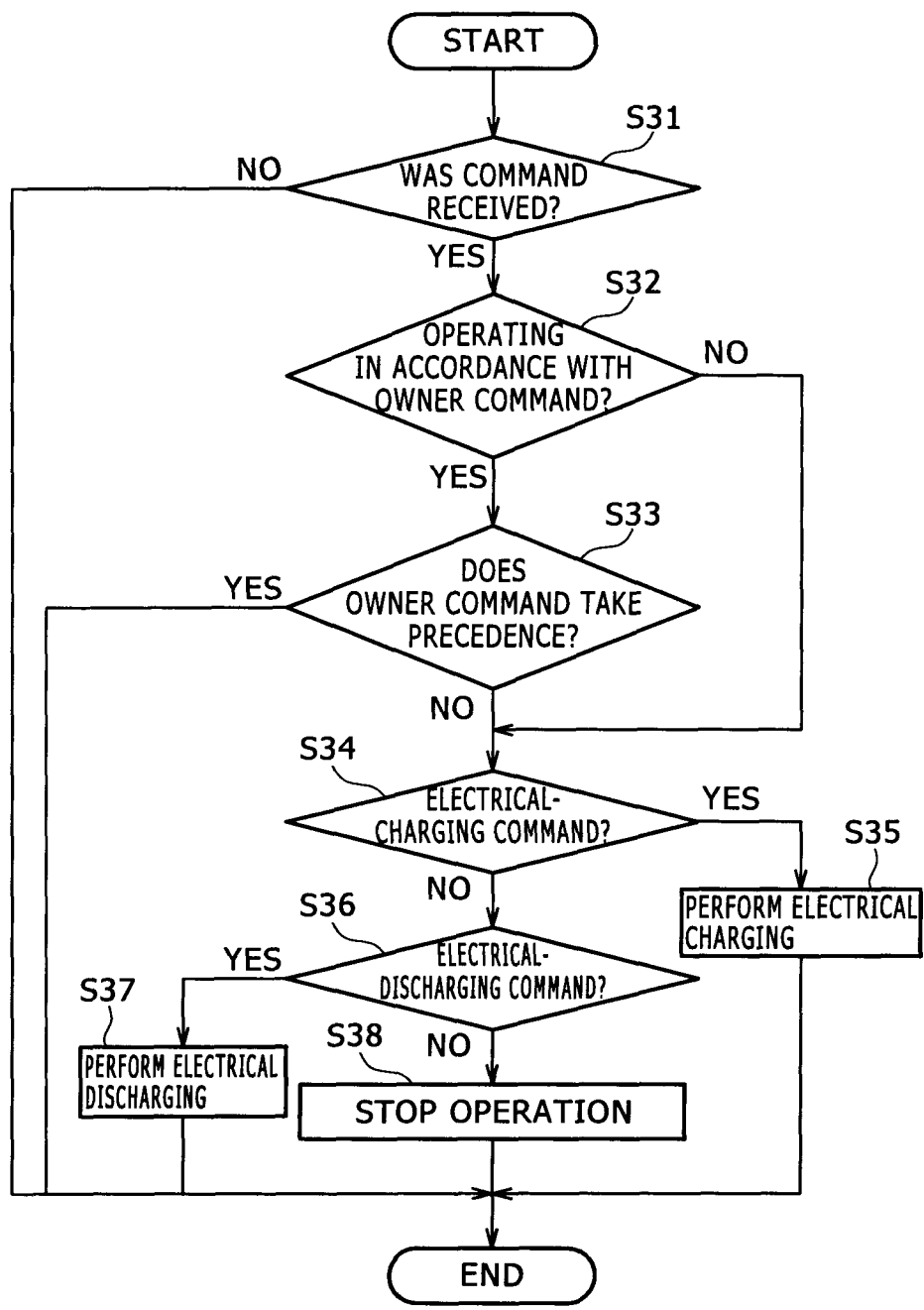

ELECTRICAL CHARGING/DISCHARGING CONTROL APPARATUS, ELECTRIC-POWER MANAGEMENT APPARATUS, ELECTRIC-POWER MANAGEMENT METHOD AND ELECTRIC-POWER MANAGEMENT SYSTEM

BACKGROUND

The present disclosure relates to an electrical charging/discharging control apparatus, an electric-power management apparatus, an electric-power management method and an electric-power management system. To put it in detail, the present disclosure relates to an electrical charging/discharging control apparatus installed in a facility for accumulating electric power, an electric-power management apparatus, an electric-power management method adopted by the electric-power management apparatus as well as an electric-power management system employing the electrical charging/discharging control apparatus and the electric-power management apparatus.

At the present day, introduction of electric-power accumulation facilities in business enterprises and ordinary homes is making progress. The electric-power accumulation facility has an electric-power accumulation battery subjected to electrical charging operations and electrical discharging operations. The electric-power accumulation battery is capable of accumulating electric power generated by a natural-energy generator or electric power purchased from an electric-power company.

Electric power accumulated in an electric-power accumulation facility includes electric power to be consumed by the owner of the electric-power accumulation facility and extra electric power which is purchased by an electric-power company at the present day. In the future where the electric-power accumulation facility will probably become more popular, however, with progress of liberation of electric power, electric power will conceivably be sold and purchased in an electric-power transaction market and the number of facility owners participating in transactions of electric power as owners of electric-power accumulation facilities will also conceivably increase as well. If it is quite within the bounds of possibility that, by participating in the electric-power transaction market, an owner of an electric-power accumulation facility is capable of gaining a profit, the number of persons each making an attempt to introduce an electric-power accumulation facility for itself and participate in the electric-power transaction market will conceivably increase.

Thus, there has been proposed an electric-power accumulation system in which changes of the price of electric power are predicted in accordance with an algorithm. Then, if the present price of electric power is low, electric power is purchased from an electric-power transaction market and accumulated in an electric-power accumulation facility. If the present price of electric power is high, on the other hand, electric power accumulated in an electric-power accumulation facility is sold to the electric-power transaction market. In this way, a profit can be gained. For more information on the proposed electric-power accumulation system, the reader is advised to refer to Japanese Patent Laid-open No. 2002-233053 (hereinafter referred to as Patent Document 1.)

SUMMARY

In accordance with the electric-power accumulation system disclosed in Patent Document 1, electric power is sold to the electric-power transaction market when the present price of electric power is high so that a person making use of the electric-power accumulation system can expect a profit. Thus, it is possible to provide not only business enterprises with an incentive for introducing electric-power accumulation facilities in the enterprises, but also ordinary homes with an incentive for introducing electric-power accumulation facilities at the homes.

However, there are a number of persons participating in the electric-power transaction market with a variety of speculations so that, due to this reason and others, it is quite within the bounds of possibility that the prediction is incorrect no matter how excellent the algorithm adopted by the electric-power accumulation system is. Thus, a person owning an electric-power accumulation facility and participating in the electric-power transaction market may incur a loss in some cases.

This is because the electric-power accumulation system disclosed in Patent Document 1 is a system designed to gain a profit from changes of the price of the electric power. Thus, the price change risk may be said to be the greatest prerequisite for the electric-power accumulation system and, hence, cannot be avoided. That is to say, in accordance with the electric-power accumulation system disclosed in Patent Document 1, a profit can be expected due to the existence of changes of the electric-power price but, a person hating the high risk of the price changes themselves may conceivably not make use of an electric-power accumulation facility.

If the changes of the price of the electric power are large, it is quite within the bounds of possibility that an owner of an electric-power accumulation facility incurs a loss in a transaction of electric power. For this reason, unfortunately, persons hesitate to introduce electric-power accumulation facilities and hesitate to participate in transactions of electric power. Thus, there are barriers to popularization of the electric-power accumulation facility. Accordingly, in order to promote the popularization of the electric-power accumulation facility, it is necessary to provide a measure and/or a policy which are adopted for eliminating the risk caused by changes of electric-power price in the electric-power transaction market.

It is desired to provide an electrical charging/discharging control apparatus capable of preventing a person making use of an electric-power accumulation facility from incurring a risk of changes of the electric-power price in an electric-power transaction market. It is also desired to provide an electric-power management apparatus, an electric-power management method adopted by the electric-power management apparatus and an electric-power management system which includes the electrical charging/discharging control apparatus and the electric-power management apparatus.

In order to solve the problems described above, in accordance with a first technology of the present disclosure, there is provided an electrical-charging/discharging control apparatus composing an electric-power accumulation facility in conjunction with an electric-power accumulation battery. The electrical-charging/discharging control apparatus includes:

a communication section configured to receive a command to carry out either of electrical charging and discharging operations on the electric-power accumulation battery from an electric-power management apparatus for managing the electrical charging and discharging operations carried out on the electric-power accumulation battery and to transmit electric-power accumulation information showing the amount of electric power accumulated in the electric-power accumulation battery to the electric-power management apparatus;

a control section configured to control the electrical charging and discharging operations carried out on the electric-power accumulation battery on the basis of the command; and a power conditioner for supplying electric power from an electric-power network to the electric-power accumulation battery and transferring electric power accumulated in the electric-power accumulation battery to the electric-power network in accordance with control carried out by the control section.

In addition, in order to solve the problems described above, in accordance with a second technology of the present disclosure, there is provided an electric-power management apparatus including:

a communication section configured to receive electric-power accumulation information showing the amount of electric power accumulated in an electric-power accumulation battery from an electrical-charging/discharging control apparatus composing an electric-power accumulation facility in conjunction with the electric-power accumulation battery; and a point issuance section configured to issue points, which correspond to an amount shown by the electric-power accumulation information as the amount of electric power accumulated in the electric-power accumulation battery, for every aforementioned electric-power accumulation facility.

On top of that, in order to solve the problems described above, in accordance with a third technology of the present disclosure, there is provided an electric-power management method including:

receiving electric-power accumulation information showing an amount of electric power accumulated in an electric-power accumulation battery from an electric-power accumulation facility including the electric-power accumulation battery; and issuing points, which correspond to the amount shown by the electric-power accumulation information as the amount of electric power accumulated in the electric-power accumulation battery, for every aforementioned electric-power accumulation facility.

In addition, in order to solve the problems described above, in accordance with a fourth technology of the present disclosure, there is provided an electric-power management system including an electrical-charging/discharging control apparatus and an electric-power management apparatus.

The electrical-charging/discharging control apparatus composes an electric-power accumulation facility in conjunction with an electric-power accumulation battery and includes:

a communication section configured to receive a command to carry out either of electrical charging and discharging operations on the electric-power accumulation battery from the electric-power management apparatus for managing the electrical charging and discharging operations carried out on the electric-power accumulation battery and for transmitting electric-power accumulation information showing the amount of electric power accumulated in the electric-power accumulation battery to the electric-power management apparatus;

a control section configured to control the electrical charging and discharging operations carried out on the electric-power accumulation battery on the basis of the command; and a power conditioner for supplying electric power from an electric-power network to the electric-power accumulation battery and transferring electric power accumulated in the electric-power accumulation battery to the electric-power network in accordance with control carried out by the control section.

The electric-power management apparatus includes:

a communication section configured to receive the electric-power accumulation information showing the amount of electric power accumulated in the electric-power accumulation battery from the electrical-charging/discharging control apparatus;

a point issuance section configured to issue points, which correspond to an amount shown by the electric-power accumulation information as the amount of electric power accumulated in the electric-power accumulation battery, for every aforementioned electric-power accumulation facility; and an electric-power management section configured to provide the electrical-charging/discharging control apparatus with a command to transfer electric power accumulated in the electric-power accumulation battery to the electric-power network or a command to supply electric power from the electric-power network to the electric-power accumulation battery.

In accordance with the present disclosure, a person owning an electric-power accumulation facility and participating in the electric-power transaction market can avoid incurrence of a risk caused by changes of the electric-power price in the market. Thus, introduction of the electric-power accumulation facility can be promoted.

BRIEF DESCRIPTION OF THE DRAWINGS

FIG. 2 is a block diagram showing the configuration of an electric-power accumulation facility included in the electric-power management system;

FIG. 7 is an explanatory diagram to be referred to in description of another typical computation of an average value of electric-power prices;

FIG. 8 is a diagram to be referred to in description of a concrete typical example of the point issuance processing; and FIG. 9 shows a flowchart representing electrical-charging/discharging control processing carried out by the electrical-charging/discharging control apparatus.

DETAILED DESCRIPTION OF THE PREFERRED EMBODIMENT

An embodiment of the present disclosure is explained below by referring to accompanying diagrams. However, implementations of the present disclosure are not limited to the embodiment. It is to be noted that the following description is divided into topics arranged as follows.
1: Embodiment
1-1: Configuration of an Electric-Power Management System
1-2: Configurations of an Electrical-Charging/Discharging Control Apparatus and an Electric-Power Accumulation Facility
1-3: Configurations of an Electric-Power/Point Management Server and a Point Exchange Server 1-4: Electric-Power Management Processing of the Electric-Power/Point Management Server
1-5: Point Issuance Processing of the Electric-Power/Point Management Server
1-6: Processing of the Electrical-Charging/Discharging Control Apparatus
2: Modified Versions

1: Embodiment 1-1: Configuration of an Electric-Power Management System

Figure 1:
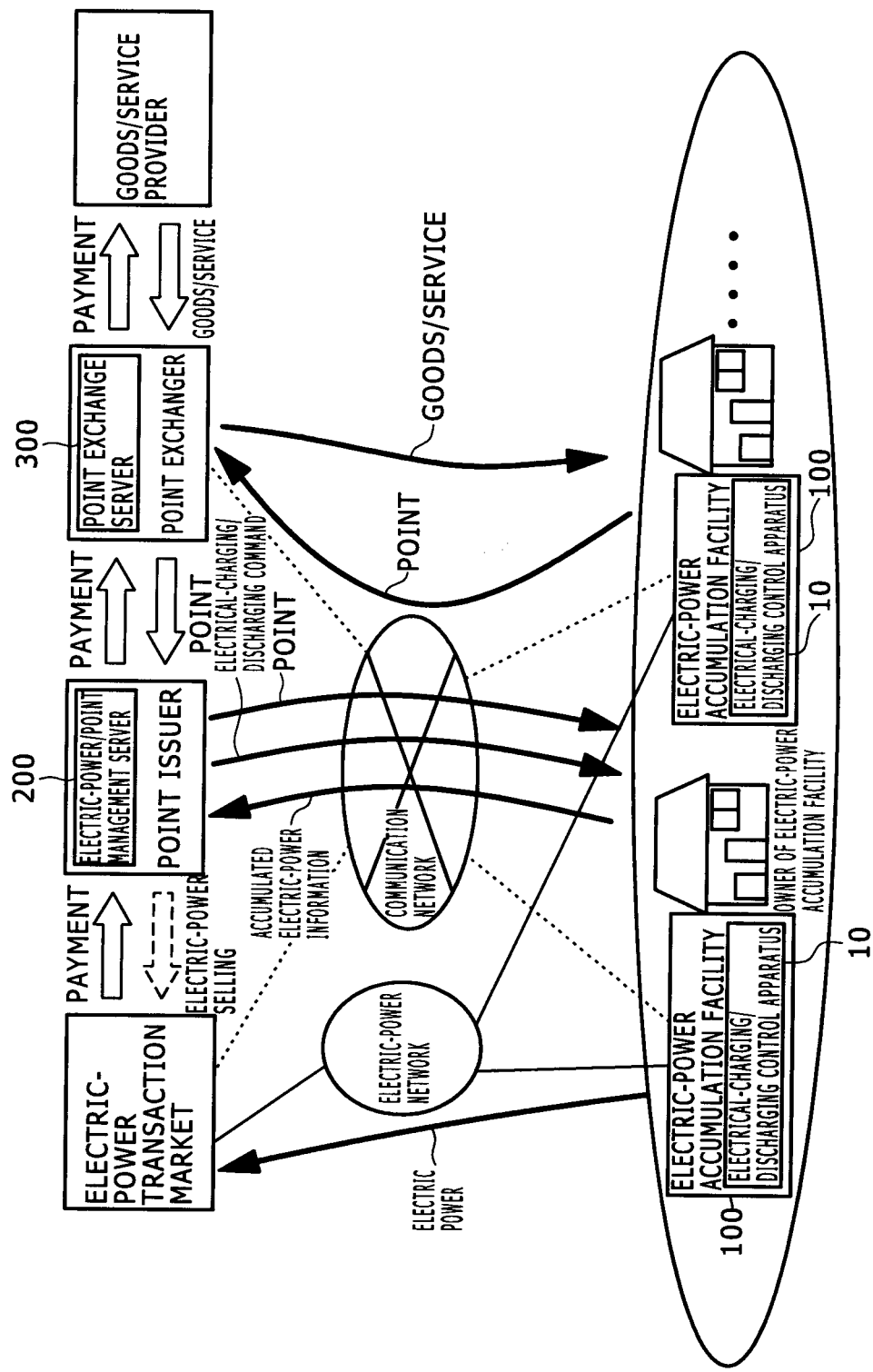
FIG. 1 is a diagram showing the entire configuration of an electric-power management system.

FIG. 1 is a diagram showing the entire configuration of an electric-power management system. As shown in the figure, the electric-power management system includes an electrical-charging/discharging control apparatus 10 and an electric-power/point management server 200. The electrical-charging/discharging control apparatus 10 composes an electric-power accumulation facility 100 in conjunction with an electric-power accumulation battery module 30 not shown in the figure. The electric-power/point management server 200 issues a command to the electrical-charging/discharging control apparatus 10 to carry out an electrical charging or electrical discharging operation in the electric-power accumulation facility 100. In addition, the electric-power/point management server 200 also issues points according to the amount of electric power accumulated in the electric-power accumulation battery module 30 employed in the electric-power accumulation facility 100 to the owner of the electric-power accumulation facility 100. The electric-power/point management server 200 corresponds to an electric-power management apparatus described in a claim of this specification.

The electric-power management system according to the present disclosure gains a profit as follows. When the price of the electric power in the electric-power transaction market is relatively low, the electric-power management system according to the present disclosure carries out an electrical charging operation in the electric-power accumulation facility 100 in order to accumulate electric charge in the electric-power accumulation battery module 30 by purchasing the electric power from the electric-power transaction market. The price of the electric power in the electric-power transaction market becomes relatively low typically at night. When the price of the electric power in the electric-power transaction market is relatively high, on the other hand, the electric-power management system according to the present disclosure carries out an electrical discharging operation in the electric-power accumulation facility 100 in order to electrically discharge electric power from the electric-power accumulation battery module 30 and sells the electric power to the electric-power transaction market. The price of the electric power in the electric-power transaction market becomes relatively high typically in the daytime.

The electric-power transaction market is a market in which electric-power transactions are carried out by market participants each wanting to purchase electric power and market participants each wanting to sell electric power. In the past, an ordinary electric-power company monopolistically supplies electric power to electric-power consumers in an area to be served by the company. In recent years, however, efforts to ease regulations of electric-power transactions are made aggressively in order to allow an institution other than the existing electric-power company also to purchase and sell electric power in the electric-power transaction market with a high degree of freedom.

As described above, the electric-power accumulation facility 100 is a facility having an electric-power accumulation battery module 30 for accumulating electric power. Thus, the electric-power accumulation facility 100 is capable of accumulating electric power purchased from the electric-power transaction market by accumulating the electric power in the electric-power accumulation battery module 30 and discharging electric power accumulated in the electric-power accumulation battery module 30 to be sold to the electric-power transaction market. The electric-power accumulation facility 100 can be constructed for a home of ordinary residents, a housing complex such as a mansion, the building of a corporation or a community of any kind or an establishment of a corporation or such a community. As described above, the electric-power accumulation facility 100 also includes the electrical-charging/discharging control apparatus 10 for controlling electrical charging and discharging operations of the electric-power accumulation battery module 30. The electric-power accumulation facility 100 is connected to an electric-power network so that the electric-power accumulation facility 100 is capable of accumulating electric power purchased from the electric-power network to the electric-power accumulation battery module 30 and discharging electric power from the electric-power accumulation battery module 30 and selling the electric power to the electric-power network in accordance with management carried out by the electric-power/point management server 200. the electric-power accumulation facility 100 and the electrical-charging/discharging control apparatus 10 will be described in detail later. It is to be noted that, in the following description, the owner of the electric-power accumulation facility 100 is also referred to as an electric-power accumulation facility owner in some cases regardless of the type of the owner of the electric-power accumulation facility 100, that is, without regard to whether the owner of the electric-power accumulation facility 100 is an enterprise, an ordinary family or another type of facility owner.

The electric-power/point management server 200 is connected to the electrical-charging/discharging control apparatus 10 of the electric-power accumulation facility 100 by a communication network through which the electric-power/point management server 200 issues points according to the amount of electric power accumulated in an electric-power accumulation facility 100 to every owner of the electric-power accumulation facility 100. In addition, the electric-power/point management server 200 is connected to the electric-power transaction market by the communication network through which the electric-power/point management server 200 acquires the price of electric power from the electric-power transaction market. The electric-power/point management server 200 also gives a command to the electrical-charging/discharging control apparatus 10 through the communication network to carry out an electrical charging or electrical discharging operation on the basis of the price of electric power. That is to say, under management carried out by the electric-power/point management server 200, electric power is purchased from the electric-power transaction market and accumulated in the electric-power accumulation battery module 30 employed in the electric-power accumulation facility 100, or electric power is discharged from the electric-power accumulation battery module 30 and sold to the electric-power transaction market.

The electric-power/point management server 200 is installed at the building of a corporation or a business operator of any kind or an establishment of a corporation or such a business operator which issues points to every owner of the electric-power accumulation facility 100. In the following description, the owner of the electric-power/point management server 200 issuing points to every owner of the electric-power accumulation facility 100 is referred to as a point issuer. Electric power is accumulated in the electric-power accumulation battery module 30 employed in an electric-power accumulation facility 100 owned by the owner of the electric-power accumulation facility 100. However, the electric-power accumulation facility 100 carries out an electrical charging operation to accumulate electric power purchased from the electric-power transaction market in the electric-power accumulation battery module 30 employed in an electric-power accumulation facility 100 through the electric-power network and an electrical discharging operation to electrically discharge electric power from the electric-power accumulation battery module 30 to be sold to the market also through the electric-power network under management carried out by the electric-power/point management server 200. Thus, the owner of the electric-power/point management server 200 is in charge of execution of the electric-power transactions in the electric-power transaction market. By selling electric power accumulated in the electric-power accumulation facility 100 to the electric-power transaction market, the point issuer receives a payment according to the electric-power price in the market and gains a profit. It is desirable to provide a configuration in which the electric-power/point management server 200 manages a number of electric-power accumulation facilities 100.

Since the electric-power transactions carried out to sell and purchase electric power in the electric-power transaction market are carried out under management of the electric-power/point management server 200, the owner of the electric-power accumulation facility 100 is capable of participating in the market without becoming concerned about the price of electric power in the market. The electric-power/point management server 200 issues points according to the amount of electric power accumulated in the electric-power accumulation battery module 30 employed in the electric-power accumulation facility 100 to the owner of the electric-power accumulation facility 100. As will be described later, the points can be exchanged for a goods/service. Thus, the owner of the electric-power accumulation facility 100 can gain a profit. In this way, in accordance with the embodiment of the present disclosure, points representing the amount of electric power accumulated in the electric-power accumulation battery module 30 employed in the electric-power accumulation facility 100 are treated as if each of the points were money.

It is to be noted that a contract can be made individually between the owner of the electric-power accumulation facility 100 and the point issuer. For example, the contract typically prescribes whether or not the operation to accumulate electric power in the electric-power accumulation battery module 30 employed in the electric-power accumulation facility 100 is to be carried out only for late-evening electric power having a low price, whether or not electric power accumulated in the battery module 30 can be consumed to operate, among other apparatus, electrical equipments owned by the owner of the electric-power accumulation facility 100 itself and whether or not the owner of the electric-power accumulation facility 100 is allowed to sell electric power accumulated in the battery module 30 to the electric-power transaction market in accordance with the will of the owner with a high degree of freedom. In the following description, the consumption of electric power accumulated in the electric-power accumulation battery module 30 in an operation of electrical equipments owned by the owner of the electric-power accumulation facility 100 itself is referred to as private-home electric-power consumption.

In addition, there may be a case in which the electric-power/point management server 200 issues a command to the electric-power accumulation facility 100 to accumulate electric power purchased from the electric-power transaction market in the electric-power accumulation battery module 30 of the electric-power accumulation facility 100 through the electric-power network or discharge electric power from the battery module and sell the electric power to the market through the electric-power network while the electric power is being spent on private-home electric-power consumption in accordance with a command issued by the owner of the electric-power accumulation facility 100 or electric power is being sold on the basis of the will of the owner itself. For such a case, it is desirable to make a contract also prescribing whether or not an operation requested by the command issued by the electric-power/point management server 200 to the electric-power accumulation facility 100 shall take precedence over the private-home electric-power consumption and selling of electric power requested by the command issued by the owner of the electric-power accumulation facility 100. In addition, it is also desirable to make a contract also prescribing whether or not an electrical-charging or electrical-discharging operation can be carried out on the basis of the will of the owner of the electric-power accumulation facility 100 itself in spite of the existence of a command issued by the electric-power/point management server 200 to the electric-power accumulation facility 100 to stop an electrical-charging or electrical-discharging operation.

It is to be noted that such an individual contract between the owner of an electric-power accumulation facility 100 and the point issuer is made typically as follows. The point issuer sets forth a plurality of contract content items to the owner of the electric-power accumulation facility 100 and the owner selects some of the items.

In order to make use of points given to the owner of the electric-power accumulation facility 100 in the configuration of the electric-power management system described above, it is desirable to add a point exchanger and a goods/service provider to the configuration.

The point exchanger sets up an exchange place at which points owned by the owner of the electric-power accumulation facility 100 are to be exchanged for a goods/service provided by the goods/service provider, and exchanges the points for the goods/service with the goods/service provider at a request made by the owner of the electric-power accumulation facility 100. The exchange place can be an actual retail premise, an actual commercial establishment or the like. As an alternative, the exchange place can also be implemented by an electronic business transaction server for presenting a goods/service by exchanging electronic information.

The point exchanger receives a payment from the point issuer as an exchange for points. These points have been obtained from the owner of the electric-power accumulation facility 100 as a result of exchanging the points for a goods/service, which is provided by the goods/service provider, through the point exchanger. (As described earlier, the owner of the electric-power accumulation facility 100 has received the points from the point issuer.) Thus, as shown in FIG. 1, the point exchanger exchanges points for a payment with the point issuer, exchanges a payment for a goods/service with the goods/service provider and exchanges a goods/service for points with the owner of the electric-power accumulation facility 100. As a result, the point exchanger can gain a profit. It is nice to let the point issuer and the point exchanger determine an exchange rate between the points and the payment in advance. It is to be noted that the point issuer and the point exchanger can be implemented by the same institution. In this case, there is no exchange of points for a payment between the point issuer and the point exchanger.

The goods/service provider provides the point exchanger with a goods/service as an exchange for a payment received from the point exchanger. To put it in detail, when the point exchanger exchanges a goods/service for points owned by the owner of the electric-power accumulation facility 100 with the owner of the electric-power accumulation facility 100 as described above, the goods/service provider receives a payment corresponding to the exchanged points from the point exchanger. Thus, the goods/service provider can make a profit as well.

The goods/service provided by the goods/service provider is a goods/service giving some physical and mental effects as well as some physical and mental satisfactions. The goods/service includes tangible goods and a service which leaves no tangible things after the service has been rendered.

Typical examples of the goods provided by the goods/service provider include tangible goods and cash vouchers. To put it in detail, typical examples of the goods include daily merchandises, home electrical appliances, electronic apparatus and foods whereas typical examples of the cash vouchers include merchandise coupons, beer coupons, travel coupons, bookstore gift cards, airline tickets and event viewing tickets. The service provided by the goods/service provider includes typical services such as a leisure service, a medical service, a lodgment service, an educational service, a transportation service, an eating-out service and a consulting service. The points may also be replaced with points of another point service such as a mileage service. The goods/service provided by the goods/service provider is not limited to the typical examples described above as the typical examples of the goods and the above typical services. That is to say, the goods/service can be any other examples of the goods and any other services as long as the other examples and the other services are subjects of economic transactions.

It is nice to let the goods/service provider determine the number of points necessary for exchanging the points for a variety of goods/services provided by the goods/service provider on the basis of an exchange rate set in advance by the point issuer and the point exchanger as an exchange rate between points and a payment. It is to be noted that the goods/service provider and the point exchanger can be implemented by the same institution. In addition, the goods/service provider, the point issuer and the point exchanger can also be implemented by the same institution.

On top of that, in accordance with the above description of the point exchanger, the goods/service provider provides a goods/service to the owner of the electric-power accumulation facility 100 through the point exchanger. However, methods adopted to provide a goods/service to the owner of the electric-power accumulation facility 100 are not limited to this described technique. If the goods/service provider actually owns and manages a retail premise, an commercial establishment or the like for example, the owner of the electric-power accumulation facility 100 may visit the retail premise, the commercial establishment or the like in order to exchange points for a goods/service sold in the retail premise, the commercial establishment or the like in an exchange transaction carried out between the owner of the electric-power accumulation facility 100 and the goods/service provider. Then, the goods/service provider hands over the points obtained in the exchange to the point issuer in order to receive a payment corresponding to the number of points from the point issuer.

If the place for exchanging the goods/service is implemented by an electronic business transaction server, the goods/service provider may directly provide the goods/service to the owner of the electric-power accumulation facility 100. If the goods provided by the goods/service provider is contents that can be provided to the owner of the electric-power accumulation facility 100 through a network for example, the goods/service provider may directly provide the contents to the owner of the electric-power accumulation facility 100 by way of the network. Typical examples of such contents are a moving picture, a piece of music and an electronic book.

1-2: Configurations of an Electrical Charging/Discharging Control Apparatus and an Electric-Power Accumulation Facility Next, the configurations of the electrical-charging/discharging control apparatus 10 and the electric-power accumulation facility 100 are explained by referring to FIG. 2. FIG. 2 is a block diagram showing the configuration of the electric-power accumulation facility 100 including the electrical-charging/discharging control apparatus 10. It is to be noted that, in FIG. 2, lines connecting blocks with each other include a bold line, thin lines and dashed lines. The bold line is a DC (direct current) electric-power line whereas a thin line is an AC (alternating current) electric-power line. On the other hand, a dashed line is a transmission line for conveying a control signal or an information signal.

As shown in the figure, the electric-power accumulation facility 100 is configured to include the electrical-charging/discharging control apparatus 10 and the electric-power accumulation battery module 30. The electric-power accumulation battery module 30 is configured to include battery cells 31 for accumulating electric power and a cell control section 32 for managing and controlling the battery cells 31. The battery composing the battery cells 31 can be any battery such as a lithium-ion secondary battery, a lithium ion polymer secondary battery or a nickel hydrogen battery as long as the battery can be used for accumulating electric power and as long as electric power accumulated in the battery can be electrically discharged. It is to be noted that, in FIG. 2, the battery cells 31 are shown as a block. However, the number of battery cells 31 is not limited to one. That is to say, a plurality of battery cells 31 can be used. The cell control section 32 is configured to typically include a CPU (Central Processing Unit), a RAM (Random Access Memory), a ROM (Read Only Memory) and a sensor for managing the state of the battery cells 31. The state of the battery cells 31 includes the temperature of the battery cells 31 and the amount of electric power accumulated in the battery cells 31. The cell control section 32 manages the battery cells 31 and also provides a control section 11 employed in the electrical-charging/discharging control apparatus 10 with information on the state of the battery cells 31.

As shown in the figure, the electrical-charging/discharging control apparatus 10 is configured to include the control section 11 cited above, a communication section 12 and a power conditioner 13. The electrical-charging/discharging control apparatus 10 controls electrical charging and electrical discharging operations in the electric-power accumulation facility 100 in accordance with management carried out by the electric-power/point management server 200 provided on the pointer-issuer side.

The control section 11 is connected to the communication section 12 and the power conditioner 13. The control section 11 is configured to typically include a CPU, a RAM and a ROM. The ROM is a memory used for storing programs to be executed by the CPU. The RAM is used as a work memory of the CPU. By executing the programs stored in the ROM, the CPU carries out various kinds of processing in order to control the entire operations of the electrical-charging/discharging control apparatus 10. In addition, in accordance with a variety of commands received by the communication section 12 from the electric-power/point management server 200, the CPU transmits control signals in order to carry out control to change the operating mode of the power conditioner 13. The commands include an electrical charging command, an electrical discharging command and a stop command. The electrical charging command is a command to purchase electric charge from the electric-charge transaction market and accumulate the purchased electric power from the market into the electric-power accumulation battery module 30 through an electric power network. The electrical discharging command is a command to electrically discharge electric power from the electric-power accumulation battery module 30 and transfer the discharged electric power to the electric-charge transaction market through the electric power network in an electric-power selling transaction. Further, the stop command is a command to stop operations carried out by the electric-power accumulation facility 100.

The communication section 12 employed in the electrical-charging/discharging control apparatus 10 is a network interface for carrying out communications with the electric-power/point management server 200 on the point-issuer side through a communication network such as the Internet or dedicated communication lines typically on the basis of a protocol determined in advance. The communications with the electric-power/point management server 200 can be carried out by adoption of any communication method such as a wire communication method, a radio LAN (Local Area Network) communication method, a Wi-Fi (Wireless Fidelity) communication method or a 3G-line communication method. The communication section 12 employed in the electrical-charging/discharging control apparatus 10 receives an electrical charging command, an electrical discharging command and a stop command which are transmitted by the electric-power/point management server 200.

In addition, in accordance with control carried out by the control section 11, the communication section 12 transmits electric-power accumulation information showing the amount of electric power accumulated in the electric-power accumulation battery module 30 to the electric-power/point management server 200. It is to be noted that the communication section 12 transmits the electric-power accumulation information to the electric-power/point management server 200 at a request made by the electric-power/point management server 200.

On top of that, the communication section 12 also carries out communications with a terminal equipment 50 owned by the owner of the electric-power accumulation facility 100 through the communication network. Typical examples of the terminal equipment 50 are a personal computer, a smart phone and a hand phone. Thus, even when the owner of the electric-power accumulation facility 100 is present at a location far away from the electric-power accumulation facility 100, the owner of the electric-power accumulation facility 100 is capable of carrying out a variety of operations including an operation to verify a variety of states including an electric-power accumulation state and an electrical-discharge state and an operation to set an operating mode.

The power conditioner 13 is connected to the electric-power accumulation battery module 30 by a DC electric-power line. In addition, the power conditioner 13 is also connected to a system electric-power section 140 through an electric-power distribution board 110 and an electric-power purchasing meter 120 by an AC electric-power line. The system electric-power section 140 is connected to the electric-power network. On top of that, the power conditioner 13 is also connected to the system electric-power section 140 through an electric-power selling meter 130 by an AC electric-power line.

The power conditioner 13 has a two-direction inverter for converting AC electric power received from the system electric-power section 140 into DC electric power and outputting the DC electric power to the electric-power accumulation battery module 30 used for accumulating the DC electric power. The two-direction inverter is also capable of converting DC electric power electrically discharged from the electric-power accumulation battery module 30 into AC electric power and supplying the AC electric power to the system electric-power section 140. In this way, electric power accumulated in the electric-power accumulation battery module 30 is electrically discharged to the system electric-power section 140.

The power conditioner 13 works in one of three operating modes, that is, an electrical-charging mode, an electrical-discharging mode or a stop mode. The electrical-charging mode is an operating mode in which electric power is being accumulated in the electric-power accumulation battery module 30 in an electric-power purchasing transaction whereas the electrical-discharging mode is an operating mode in which electric power is being electrically discharged from the electric-power accumulation battery module 30 in an electric-power selling transaction. On the other hand, the stop mode is an operating mode in which no electric power is being accumulated in the electric-power accumulation battery module 30 and no electric power is being electrically discharged from the electric-power accumulation battery module 30. The operating mode of the power conditioner 13 is switched from one to another by a control signal received from the control section 11.

In addition, when electric power is electrically discharged from the electric-power accumulation battery module 30, the power conditioner 13 measures the amount of the electric power electrically discharged from the electric-power accumulation battery module 30. By the same token, when electric power is accumulated into the electric-power accumulation battery module 30, the power conditioner 13 measures the amount of the electric power accumulated into the electric-power accumulation battery module 30.

In this embodiment, electric power purchased from the electric-power transaction market is supplied from the electric-power network to the electric-power accumulation battery module 30 whereby the purchased electric power is accumulated. In addition, the power conditioner 13 obtains electric power from the electric-power accumulation battery module 30 and transfers the electric power to the electric-power network through the system electric-power section 140 in order to sell the electric power to the electric-power transaction market.

It is to be noted that, in a transaction to sell electric power to the electric-power transaction market by transferring the electric power from the power conditioner 13 to the electric-power network through the system electric-power section 140, the electric-power selling meter 130 measures a sold electric-power amount which is the amount of the electric power transferred from the power conditioner 13 to the system electric-power section 140, that is, the amount of sold electric power. When the electric-power selling meter 130 measures the amount of sold electric power, the electric-power selling meter 130 may also detect a time at which the electric-power selling meter 130 measures the amount of sold electric power. The electric-power selling meter 130 is connected to the control section 11 so that the electric-power selling meter 130 is capable of notifying the control section 11 of the amount of sold electric power. The reader is advised to keep in mind that, in order to assure the reliability of the measurement result produced by the electric-power selling meter 130, it is preferable to have the owner of the electric-power accumulation facility 100 receive a predetermined certification or the like from typically the point issuer for the electric-power selling meter 130 in advance.

The reader is also advised to keep in mind that it is preferable to provide a sensor on a DC electric-power line, which connects the power conditioner 13 and the electric-power accumulation battery module 30 to each other, to serve as an electric-power measurement device for measuring the amount of electric power transferred through the DC electric-power line. In addition, it is also preferable to provide the power conditioner 13 with a sensor for detecting an abnormality occurring in the electric-power accumulation battery module 30. A typical example of such an abnormality sensor is a temperature sensor for detecting changes of the temperature of the electric-power accumulation battery module 30.

The control section 11 included in the configuration of the electrical-charging/discharging control apparatus 10 is also connected to an input section 21, a display section 22 and a storage section 23 which are provided externally to the electrical-charging/discharging control apparatus 10. The input section 21 is input means for receiving a command issued by the user to the electrical-charging/discharging control apparatus 10. The input section 21 is configured to include typically a touch screen, buttons, switches and a dial. The touch screen is normally integrated with the display section 22. When an input is supplied to the input section 21, the input section 21 generates a control signal representing the input and supplies the control signal to the control section 11. Then, the control section 11 controls an operation processing corresponding to the control signal.

The display section 22 is display means configured as typically an LCD (Liquid Crystal Display) unit, a PDP (Plasma Display Panel), an organic EL (Electro Luminescence) panel or the like. The display section 22 displays various kinds of information such as the electrical-charging state of the electric-power accumulation facility 100, the electrical-discharging state of the electric-power accumulation facility 100, the number of points received by the owner of the electric-power accumulation facility 100 from the point issuer as well as a contract made by the owner of the electric-power accumulation facility 100 and the point issuer.

The storage section 23 is a recording medium configured from typically a hard disk, a flash memory or the like. The storage section 23 is used for storing various kinds of information such as the number of points received by the owner of the electric-power accumulation facility 100 from the point issuer, the contents of a contract made by the owner of the electric-power accumulation facility 100 and the point issuer and a certification between the electric-power accumulation facility 100 and the electric-power/point management server 200. The number of points, the contents of the contract, the certification and other information which have been stored in the storage section 23 are displayed on the display section 22. Thus, the owner of the electric-power accumulation facility 100 is capable of knowing information such as the number of points presently owned by the owner, a history of past point increases and past point decreases as well as the contents of the contract. The contract contents stored in the storage section 23 typically include information prescribing whether or not the electrical-charging/discharging control apparatus 10 shall allow a command issued by the electric-power/point management server 200 to the electric-power accumulation facility 100 to take precedence over a command issued by the owner of the electric-power accumulation facility 100 to the electric-power accumulation facility 100. This information is used by the control section 11 for controlling the electrical charging/discharging operations.

It is to be noted that the point issuer and the point exchanger can be implemented by the same enterprise or the same institution in the electric-power management system and services are provided by such an electric-power management system as the so-called cloud service in the Internet. In such a configuration, the storage section 23 is not required because the various kinds of information described above are all held and managed by the electric-power/point management server 200 provided on the point-issuance side.

The configurations of the electrical-charging/discharging control apparatus 10 and the electric-power accumulation facility 100 have been described above. It is to be noted that the electric-power distribution board 110 provided between the power conditioner 13 and the system electric-power section 140 is also connected to a plurality of external electrical equipments 150. The system electric-power section 140 transfers electric power to the external electrical equipments 150 by way of the electric-power distribution board 110 so that the owner of the electric-power accumulation facility 100 can make use of the external electrical equipments 150. In addition, electric power accumulated in the electric-power accumulation battery module 30 is transferred to the external electrical equipments 150 by way of the power conditioner 13 and the electric-power distribution board 110 so that the owner of the electric-power accumulation facility 100 can make use of the external electrical equipments 150.

Typical examples of the electrical equipment 150 used at an ordinary home are home appliances such as an electronic apparatus, a refrigerator, an electronic range, a washing machine and an air conditioner. Typical examples of the electronic apparatus are a television receiver and an audio equipment. On the other hand, typical examples of the electrical equipment used in a business office are a personal computer, a photo copy machine, a facsimile, a printer and an air conditioner. In addition, typical examples of the electrical equipment used in a retail premise, a commercial establishment or the like are an illumination apparatus, an air conditioner and a transport equipment such as an elevator.

Figure 3B:
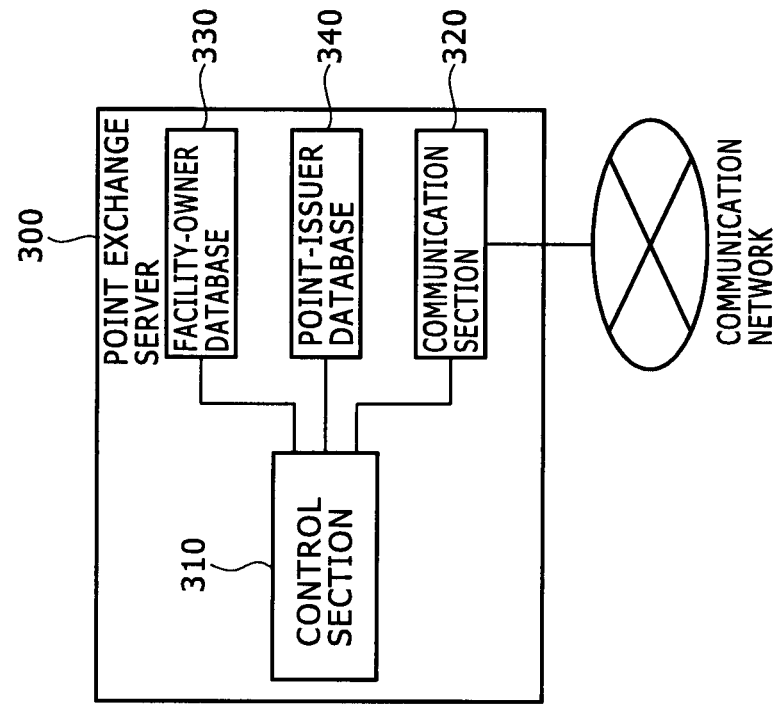
FIGS. 3A and 3B are a plurality of block diagrams showing the configurations of an electric-power/point management server.
Figure 3A:
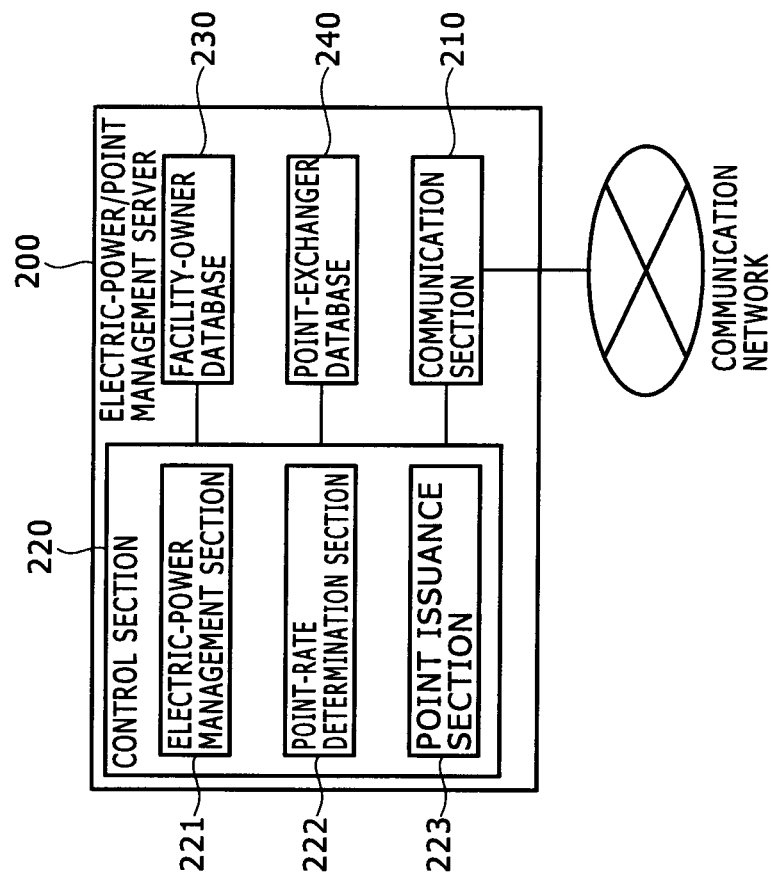

1-3: Configurations of an Electric-Power/Point Management Server and a Point Exchange Server Next, the following description explains the configuration of the electric-power/point management server 200 provided on the point-issuer side. FIG. 3A is a block diagram showing the configuration of the electric-power/point management server 200. As shown in the figure, the electric-power/point management server 200 is configured to include a communication section 210, a control section 220, a facility-owner database 230 and a point-exchanger database 240. The control section 220 includes an electric-power management section 221, a point-rate determination section 222 and a point issuance section 223.

The communication section 210 is a network interface for carrying out communications with the electric-power accumulation facility 100 through a communication network such as the Internet typically on the basis of a protocol determined in advance. The communications between the electric-power/point management server 200 and the electric-power accumulation facility 100 can be carried out by adoption of any communication method such as a wire communication method, a radio LAN (Local Area Network) communication method, a Wi-Fi (Wireless Fidelity) communication method or a 3G-line communication method. The communication section 210 transmits an electrical charging command, an electrical discharging command and a stop command which are issued by the electric-power management section 221 to the electrical-charging/discharging control apparatus 10. In addition, the communication section 210 receives accumulated electric-power amount information transmitted by the electrical-charging/discharging control apparatus 10. The accumulated electric-power amount information is information on the amount of electric power accumulated in the electric-power accumulation battery module 30. It is to be noted that the electrical-charging/discharging control apparatus 10 transmits the accumulated electric-power amount information indicating the amount of electric power accumulated in the electric-power accumulation battery module 30 to the communication section 210 at a request made by the electric-power/point management server 200. Also, the communication section 210 is connected to a server of an electric-power company participating in the electric-power transaction market through a communication network. As an alternative, the communication section 210 is connected to a server of a broker, which mediates electric-power transactions in the electric-power transaction market, through the communication network. Thus, the communication section 210 is capable of obtaining the price of electric power in the electric-power transaction market. In addition, the communication section 210 also carries out communications required for an electric-power transaction in the electric-power transaction market with typically the server of an electric-power company in accordance with a command received from the electric-power management section 221. A typical example of the electric-power transaction is a purchase order issued to the electric-power transaction market.

The control section 220 is configured to include typically a CPU, a RAM and a ROM. The ROM is a memory used for accumulating programs to be executed by the CPU. The RAM is used as a work memory of the CPU. By executing the programs accumulated in the ROM, the CPU carries out various kinds of processing in order to control the entire operations of the electric-power/point management server 200. In addition, by executing programs determined in advance, the CPU carries out functions of the electric-power management section 221, the point-rate determination section 222 and the point issuance section 223.

The electric-power management section 221 makes use of the electric-power price received by the communication section 210 in order to determine the amount of electric power to be transferred to the electric-power network and sold to the electric-power transaction market and the timing of the electric-power transfer on the basis of algorithm determined in advance, issuing an electrical-charging command, an electrical-discharging command and a stop command. The issued commands are transmitted to the electrical-charging/discharging control apparatus 10 by the communication section 210. The issuance of the commands will be described later in detail.

The point-rate determination section 222 determines the exchange rate between the points given to the owner of the electric-power accumulation facility 100 and the accumulated electric-power information showing the amount of electric power accumulated in the electric-power accumulation battery module 30. In the following description, the exchange rate between the points and the accumulated electric-power information is also referred to merely as a point rate. In accordance with this embodiment, points are given to the owner of the electric-power accumulation facility 100 on the basis of the amount of electric power accumulated in the electric-power accumulation battery module 30. Point-rate information showing the point rate is supplied to the point issuance section 223.

On the basis of the accumulated electric-power information showing the amount of electric power accumulated in the electric-power accumulation battery module 30 and the point-rate information received from the point-rate determination section 222, the point issuance section 223 issues points for the owner of the electric-power accumulation facility 100. The issued points are stored in typically the facility-owner database 230 and managed for every owner. In addition, it is possible to provide a configuration in which point information showing issued points is transmitted to the electrical-charging/discharging control apparatus 10 through the communication network. The determination of the point rate and the management of the point rate will be explained later in detail.

The facility-owner database 230 is a database used for storing owner information for every electric-power accumulation facility 100. The owner information is information on the owner of an electric-power accumulation facility 100. The owner information of an electric-power accumulation facility 100 includes the name, the address, and the telephone number of the owner of the electric-power accumulation facility 100, the ID and the certification of the electric-power accumulation facility 100. However, the owner information is by no means limited to the name, the address, the telephone number, the ID and the certification. That is to say, the owner information may include any other information as long as the other information can be conceivably acquired by the point issuer and conceivably used on the point-issuer side as agreed by the owner of the electric-power accumulation facility 100.

In addition, the facility-owner database 230 is also used for storing contract information showing the contents of a contract made by the point issuer and the owner of the electric-power accumulation facility 100. The electric-power management section 221 can refer to the contract information during electric-power management processing.

The owner information is presented by the owner of the electric-power accumulation facility 100 to the point issuer as a written document or the like and stored by the point issuer in the facility-owner database 230 typically when the owner of the electric-power accumulation facility 100 and the point issuer make a contract. In addition, it is possible to provide a configuration in which, when the owner of the electric-power accumulation facility 100 starts to make use of the electric-power management system, the display section 22 connected to the electrical-charging/discharging control apparatus 10 displays an input screen showing a request prompting the owner of the electric-power accumulation facility 100 to enter the owner information to the display section 22. At the request displayed on the screen, the owner of the electric-power accumulation facility 100 enters the owner information by operating the input section 21. Then, the electric-power accumulation facility 100 transmits the entered owner information to the electric-power/point management server 200 by way of the communication network to be stored in the facility-owner database 230.

The point-exchanger database 240 is a database used for storing point-exchanger information, which is information on a point exchanger, for every point exchanger. The point-exchanger information includes the name of the point exchanger, the name of an enterprise associated with the point exchanger, the name of a group associated with the point exchanger, the address of the point exchanger, the telephone number of the point exchanger and the contents of the contract. However, the point-exchanger information is by no means limited to the point-exchanger name, the enterprise name, the group name, the address, the telephone number and the contents of the contract. That is to say, the point-exchanger information may include any other information as long as the other information can be conceivably acquired by the point issuer and conceivably used on the point-issuer side as agreed by the point exchanger.

The point-exchanger information is presented by the point exchanger to the point issuer as a written document or the like and inputted and stored by the point issuer in the point-exchanger database 240 typically when the point exchanger and the point issuer make a contract. In addition, it is possible to provide a configuration in which the point exchanger and the point issuer communicate with each other through the communication network in order to store the point-exchanger information in the point-exchanger database 240. It is to be noted that, if the point exchanger and the point issuer are implemented by the same enterprise, the same institution or the like, the point-exchanger information and the point-exchanger database 240 are not required.

Next, the point exchange server 300 provided on the point-exchanger side is explained. FIG. 3B is a block diagram showing the configuration of the point exchange server 300. As shown in the figure, the point exchange server 300 is configured to include a control section 310, a communication section 320, a facility-owner database 330 and a point-issuer database 340.

The control section 310 is configured to include typically a CPU, a RAM and a ROM. By executing the programs accumulated in the ROM, the CPU carries out various kinds of processing in order to control the entire operations of the point exchange server 300.

The communication section 320 is a network interface for carrying out communications with the electric-power accumulation facility 100 through a communication network such as the Internet typically on the basis of a protocol determined in advance. The point exchange server 300 is connected to the owner of the electric-power accumulation facility 100 through the communication network. Thus, through the communication network, the point exchange server 300 is capable of exchanging a goods/service received from the goods/service provider for points with the owner of the electric-power accumulation facility 100. In addition, the point exchange server 300 is also capable of exchanging points for a payment with the point issuer operating the electric-power/point management server 200 and exchanging a payment for a goods/service with the goods/service provider. If the service in the electric-power management system is provided as a cloud service, however, the point issuer can transmit points to the point exchanger in accordance with a command given by the owner of the electric-power accumulation facility 100. In addition, it is also possible to construct a configuration in which the communication section 320 provides some goods/services through the communication network. The goods/services that can be provided by the communication section 320 through the communication network include an electronic book, a musical content, a movie content and a variety of coupons. It is to be noted that, as described above, points may be exchanged for a goods/service also at an actual exchange office.

The facility-owner database 330 is a database used for storing owner information, which is information on the owner of the electric-power accumulation facility 100, for each of such owners. The owner information includes the name of the owner of the electric-power accumulation facility 100, the address of the owner, the telephone number of the owner, the registration number of the owner and a history of exchanges of goods/services. However, the owner information is by no means limited to the name, the address, the telephone number, the registration number and such a history. That is to say, the owner information may include any other information as long as the other information can be conceivably acquired by the point exchanger and conceivably used on the point-exchanger side as agreed by the owner of the electric-power accumulation facility 100. It is to be noted that the owner information stored in the facility-owner database 330 of the point exchange server 300 can be the same as the owner information stored in the facility-owner database 230 of the electric-power/point management server 200.

The point-issuer database 340 is a database used for storing point-issuer information, which is information on a point issuer, for each point issuer. The point-issuer information includes the name of the point issuer, the name of an enterprise associated with the point issuer, the name of a group associated with the point issuer, the address of the point issuer, the telephone number of the point issuer and the contents of the contract. However, the point-issuer information is by no means limited to the point-issuer name, the enterprise name, the group name, the address, the telephone number and the contents of the contract. That is to say, the point-issuer information may include any other information as long as the other information can be conceivably acquired by the point exchanger and conceivably used on the point-exchanger side as agreed by the point issuer.

1-4: Electric-Power Management Processing of the Electric-Power/Point Management Server Next, processing carried out by the electric-power/point management server 200 is explained. The processing carried out by the electric-power/point management server 200 includes electric-power management processing and point issuance processing. The electric-power management processing includes processing carried out to accumulate electric power purchased from the electric-power transaction market into the electric-power accumulation battery module 30 and processing carried out to electrically discharge electric power from the electric-power accumulation battery module 30 to be sold to the electric-power transaction market. Also, the point issuance processing is processing carried out to issue points to the owner of the electric-power accumulation facility 100.

Figure 4:
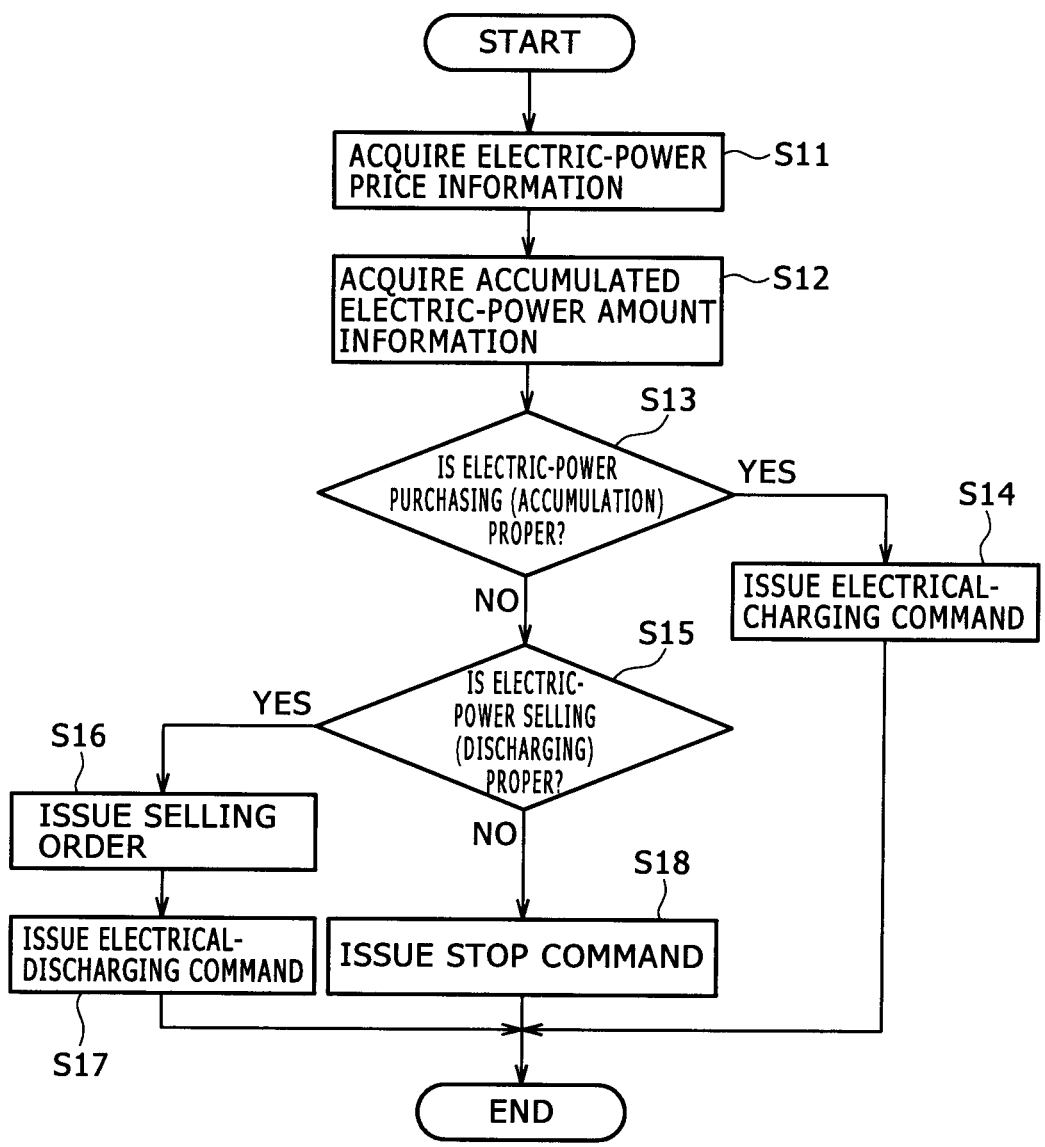
FIG. 4 shows a flowchart representing electric-power management processing carried out by the electric-power/point management server.

First of all, the electric-power management processing is explained as follows. FIG. 4 shows a flowchart representing the electric-power management processing carried out by the electric-power/point management server 200. As shown in the figure, the flowchart begins with a step S11. At this step, the electric-power/point management server 200 acquires electric-power price information which is information on the price of electric power in the electric-power transaction market from, among others, the server of an electric-power company participating in the electric-power transaction market or a broker which mediates electric-power transactions in the electric-power transaction market. Then, at the next step S12, from the electrical-charging/discharging control apparatus 10, the electric-power/point management server 200 acquires accumulated electric-power information showing the amount of electric power accumulated in the electric-power accumulation battery module 30. It is to be noted that the operation to acquire the accumulated electric-power information from the electrical-charging/discharging control apparatus 10 is carried out not only during the electric-power management processing, but also carried out periodically. When the operation to acquire the accumulated electric-power information from the electrical-charging/discharging control apparatus 10 is carried out during the electric-power management processing, the electric-power management processing is performed on the basis of the accumulated electric-power information obtained at that time as the most recent amount of electric power accumulated in the electric-power accumulation battery module 30.

Subsequently, at the next step S13, the electric-power/point management server 200 determines whether or not an operation to purchase electric power from the electric-power transaction market and accumulate the electric power in the electric-power accumulation battery module 30 is proper. The electric-power/point management server 200 can determine whether or not an operation to purchase electric power from the electric-power transaction market and accumulate the electric power in the electric-power accumulation battery module 30 is proper typically by determining a purchasing threshold price in advance and comparing the predetermined purchasing threshold price with the current price of electric power in the electric-power transaction market. The electric-power/point management server 200 determines that an operation to purchase electric power from the electric-power transaction market and accumulate the electric power in the electric-power accumulation battery module 30 is proper if the current price of electric power in the electric-power transaction market is lower than the predetermined purchasing threshold price. In addition, the electric-power/point management server 200 may also determine whether or not an operation to purchase electric power from the electric-power transaction market and accumulate the electric power in the electric-power accumulation battery module 30 is proper by adoption of typically a method described in Japanese Patent Laid-open No. 2002-233053.

First of all, time-axis data of the electric-power price obtained at the step S11 is accumulated and time-axis changes of the price of electric power are analyzed in order to predict future changes of the price of electric power. The future changes of the price of electric power are used to determine an appropriate amount of electric power to be purchased from the electric-power transaction market and a proper timing to purchase the electric power. To put it in detail, the time-axis data of previous changes of the electric-power price are analyzed in order to compute a change-based predicted value (or a reference predicted value) of the price of electric power. As a method for predicting a future price from the time-axis data of previous changes of the electric-power price, there is provided a pattern analysis based on a neural network. In addition, in order to predict a future price with a high degree of precision, a sensitivity for variations of the price of electric power may be computed to be reflected in the prediction. Typically, such a sensitivity is computed by making use of a correlative relation of the price of electric power for a case in which past meteorological information and external factors such as the trend of a demand for electric power are generated. For example, the price of electric power is known to increase by 1 yen/kWh if the atmospheric temperature increases by 1° C. In this case, the variation sensitivity for this meteorological condition is 1 yen/(kWh·° C.). If the variation sensitivity is reflected in the reference predicted value, for a case in which a meteorological condition and external factors such the trend of a demand for electric power are taken into consideration, the predicted value of the price of electric power is computed in accordance with Eq. (1) given below. Strictly speaking, the predicted value of the price of electric power is the predicted value of prices of purchased electric power.

$$\text{Predicted value of purchased electric-power price} = \\ \text{(Reference predicted value(computed from time-axis data))} \times \text{(Sensitivity for meteorological condition)} \times \text{(Sensitivity for external factors)} \quad (1)$$

Then, the predicted value computed as described above as the predicted value of the purchased electric-power price and the time-axis data of the previous electric-power prices are subjected to statistical processing in order to compute an electric-power purchasing reference price which is the expected value of the minimum value of electric-power prices up to a certain time determined in advance. If the electric-power price indicated by the electric-power price information as the electric-power price in the electric-power transaction market is lower than this electric-power purchasing reference price, the operation to purchase electric power from the electric-power transaction market and accumulate the electric power in the electric-power accumulation battery module 30 is determined to be proper. If the electric-power price indicated by the electric-power price information as the price of electric power in the electric-power transaction market is higher than this electric-power purchasing reference price, on the other hand, the operation to purchase electric power from the electric-power transaction market and accumulate the electric power in the electric-power accumulation battery module 30 is determined to be improper.

It is to be noted that algorithms usable in the process to determine whether or not the operation to purchase electric power from the electric-power transaction market and accumulate the electric power in the electric-power accumulation battery module 30 is proper are by no means limited to the algorithm described above. That is to say, any other algorithm can be adopted as long as the other algorithm can be used to determine the amount of electric power to be purchased from the electric-power transaction market and the timing to purchase the electric power from the market from electric-power price changes in the market, the predicted value and the amount of purchasable electric power. For example, a program used for another existing market such as a stock market can be modified to one suitable for the electric-power transaction market. A typical example of the program for a stock market is program used for automatic stock selling and stock purchasing.

If the electric-power/point management server 200 determines at the step S13 that the operation to purchase electric power from the electric-power transaction market and accumulate the electric power in the electric-power accumulation battery module 30 is proper, that is, if the result of the determination process carried out at the step S13 is Yes, the flow of the processing represented by the flowchart goes on to a step S14. At the step S14, the electric-power/point management server 200 issues an electrical charging command to the electrical-charging/discharging control apparatus 10 being managed by the electric-power/point management server 200 to carry out an electrical charging operation. It is to be noted that, the electrical charging command may include information such as the electrical charging time period and the amount of electric power to be accumulated in the electrical charging command in addition to a request for the electrical charging operation.

If the electric-power/point management server 200 determines at the step S13 that the operation to purchase electric power from the electric-power transaction market and accumulate the electric power in the electric-power accumulation battery module 30 is not proper, that is, if the result of the determination process carried out at the step is No, on the other hand, the flow of the processing represented by the flowchart goes on to a step S15. At the step S15, the electric-power/point management server 200 determines whether or not an operation to electrically discharge electric power from the electric-power accumulation battery module 30 and sell the electric power to the electric-power transaction market is proper.

The electric-power/point management server 200 can determine whether or not an operation to electrically discharge electric power from the electric-power accumulation battery module 30 and sell the electric power to the electric-power transaction market is proper typically by determining a selling threshold price in advance and comparing the predetermined selling threshold price with the price of electric power in the electric-power transaction market. The electric-power/point management server 200 determines that an operation to electrically discharge electric power from the electric-power accumulation battery module 30 and sell the electric power to the electric-power transaction market is proper if the price of electric power in the electric-power transaction market is higher than the predetermined selling threshold price. In addition, the electric-power/point management server 200 may also determine whether or not an operation to electrically discharge electric power from the electric-power accumulation battery module 30 and sell the electric power to the electric-power transaction market is proper by adoption of typically a method described in Japanese Patent Laid-open No. 2002-233053.

An electric-power selling price is equal to the product of the amount of accumulated electric power and the price of electric power. In addition, the electric-power accumulation facility 100 incurs an electric-power accumulation cost of carrying out the operation to accumulate electric power in the electric-power accumulation facility 100. In order to make the following explanation simple, it is assumed that the electric-power accumulation cost of carrying out the operation to accumulate electric power in the electric-power accumulation facility 100 is fixed every day. Thus, an electric-power accumulation profit obtained from the operation carried out by the electric-power accumulation facility 100 to accumulate electric power in the electric-power accumulation facility 100 is expressed by the following equations.

Electric-power accumulation profit=(Electric-power selling price)−(Electric-power purchasing price)−(Electric-power accumulation cost) (2)

Electric-power purchasing price=(Amount of purchased electric power)×(Electric-power price in purchasing period) (3)

Electric-power selling price=(Amount of purchased electric power)×(100−Discharging rate(%/day)×Electric-power accumulation day count)×(Electric-power price in selling period) (4)

Electric-power accumulation cost=(Cost unit price (yen/day))×(Electric-power accumulation day count) (5)

Electric-power price changes with the lapse of time are predicted by adoption of the same method as the one described above and the predicted value of the electric-power accumulation profit gained by accumulation of electric power is computed. The predicted value of the electric-power accumulation profit is the predicted value of the profit gained in an operation to sell electric power. This predicted value is subjected to statistical processing in order to compute an electric-power selling reference profit which is the expected value of the maximum value of profits made up to a certain time determined in advance. If the profit computed at a certain time is higher than the electric-power selling reference profit, the operation to electrically discharge electric power from the electric-power accumulation battery module 30 and sell the electric power to the electric-power transaction market is determined to be proper.

It is to be noted that algorithms usable in the process to determine whether or not the operation to electrically discharge electric power from the electric-power accumulation battery module 30 and sell the electric power to the electric-power transaction market is proper are by no means limited to the algorithm described above. That is to say, any other algorithm can be adopted as long as the other algorithm can be used to determine the amount of electric power to be sold to the electric-power transaction market and the timing to sell the electric power to the market from price changes in the market, the predicted value and the amount of salable electric power. For example, a program used for another existing market such as a stock market can be modified to one suitable for the electric-power transaction market. A typical example of the program for a stock market is program used for automatic stock selling and stock purchasing.

If the electric-power/point management server 200 determines at the step S15 that the operation to electrically discharge electric power from the electric-power accumulation battery module 30 and sell the electric power to the electric-power transaction market is proper, that is, if the result of the determination process carried out at the step S15 is Yes, the flow of the processing represented by the flowchart goes on to a step S16. At the step S16, the electric-power/point management server 200 issues an electric-power selling order to the electrical-charging/discharging control apparatus 10 being managed by the electric-power/point management server 200 to sell electric power to the electric-power transaction market. Then, after an electric-power selling order transaction with the electric-power transaction market has been completed, the electric-power/point management server 200 issues an electrical discharging command to the electrical-charging/discharging control apparatus 10 to carry out an electrical discharging operation in order to electrically discharge the electric power from the electric-power accumulation battery module 30 at the next step S17. The reader is advised to keep in mind that it is nice to also include information such as the electrical discharging time period and the amount of electric power to be electrically discharged in the electrical charging command in addition to a request for the electrical discharging operation.

If the electric-power/point management server 200 determines at the step S15 that the operation to electrically discharge electric power from the electric-power accumulation battery module 30 and sell the electric power to the electric-power transaction market is not proper, that is, if the result of the determination process carried out at the step S15 is No, on the other hand, the flow of the processing represented by the flowchart goes on to a step S18. That is to say, the flow of the processing represented by the flowchart goes on to a step S18 if the electric-power/point management server 200 determines that the operation to purchase electric power from the electric-power transaction market electric power and accumulate the electric power in the electric-power accumulation battery module 30 is not proper and determines at the step S15 that the operation to electrically discharge electric power from the electric-power accumulation battery module 30 and sell the electric power to the electric-power transaction market is not proper. At the step S18, the electric-power/point management server 200 issues a stop command to the electrical-charging/discharging control apparatus 10 being managed by the electric-power/point management server 200 to put the electric-power accumulation facility 100 in a halted state.

The electric-power management processing is carried out as described above. The electric-power/point management server 200 makes a decision to sell electric power accumulated in the electric-power accumulation facility 100 to the electric-power transaction market on the basis of a relation with the price of electric power in the market. Thus, the point issuer can gain a profit. In addition, the owner of the electric-power accumulation facility 100 does not need to become concerned about the price of electric power in the electric-power transaction market.

1-5: Point Issuance Processing of the Electric-Power/Point Management Server

Figure 5:
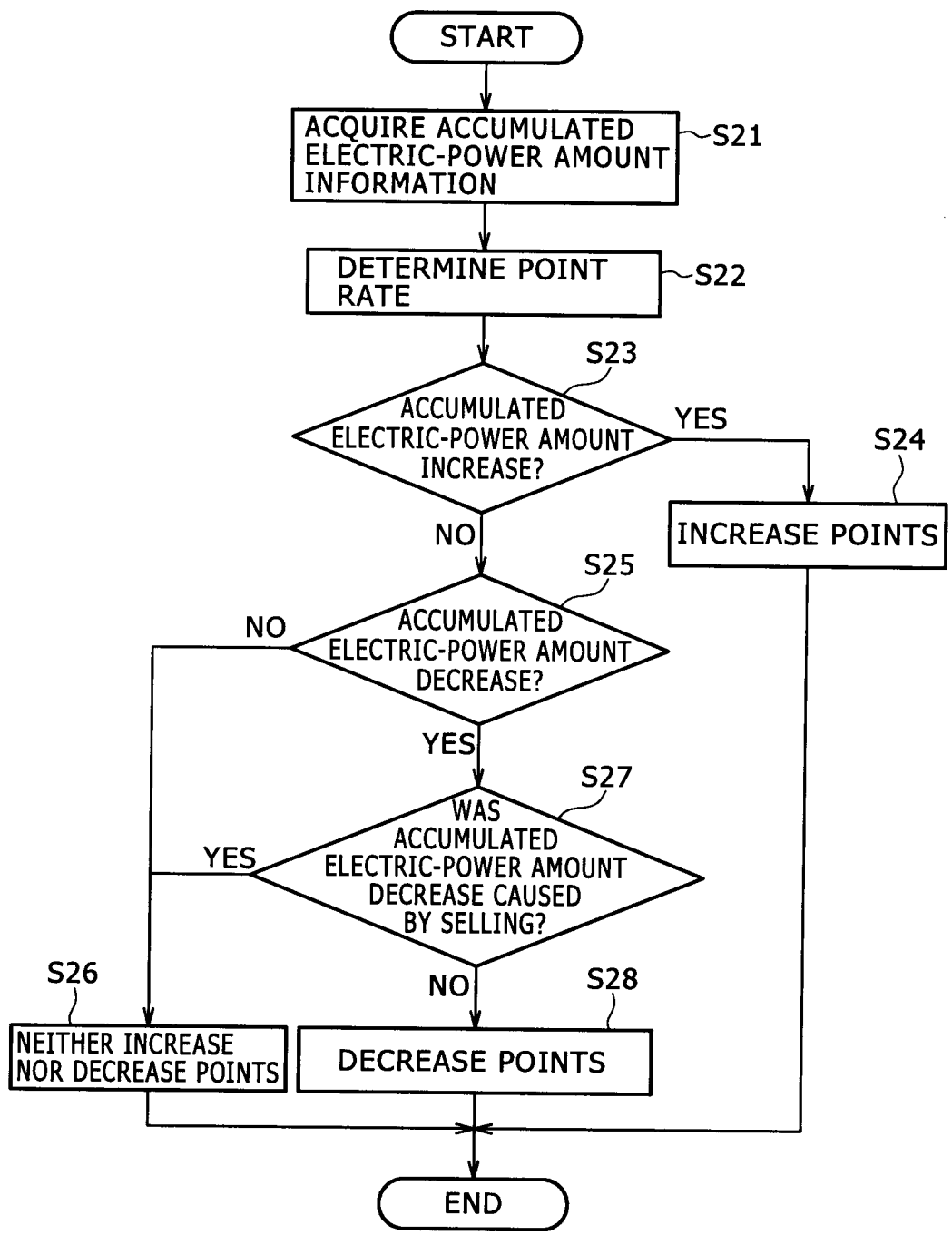
FIG. 5 shows a flowchart representing point issuance processing carried out by the electric-power/point management server.

Next, point issuance processing carried out by the electric-power/point management server 200 is explained as follows. FIG. 5 shows a flowchart representing point issuance processing carried out by the electric-power/point management server 200. The point issuance processing carried out by the electric-power/point management server 200 is processing to give points to the owner of the electric-power accumulation facility 100 in accordance with the amount of electric power accumulated in the electric-power accumulation battery module 30. As shown in FIG. 5, the flowchart begins with a step S21 at which the electric-power/point management server 200 acquires accumulated electric-power amount information showing the amount of electric power accumulated in the electric-power accumulation battery module 30 from the electrical-charging/discharging control apparatus 10. It is to be noted that the operation to acquire the accumulated electric-power information from the electrical-charging/discharging control apparatus 10 is carried out not only during the electric-power management processing. That is to say, the operation to acquire the accumulated electric-power information from the electrical-charging/discharging control apparatus 10 is also carried out periodically. When the operation to acquire the accumulated electric-power information from the electrical-charging/discharging control apparatus 10 is carried out during the electric-power management processing, the electric-power management processing is performed on the basis of the accumulated electric-power information obtained at that time as the most recent amount of electric power accumulated in the electric-power accumulation battery module 30.

Then, at the next step S22, the electric-power/point management server 200 determines a point rate. A method for determining a point rate is explained as follows. First of all, the electric-power/point management server 200 fixes a goods/service rate which is defined as the ratio of the number of points necessary for obtaining a goods/service provided by the goods/service provider to the price of the goods/service.

Then, the electric-power/point management server 200 computes an average electric-power price of prices of electric power in the electric-power transaction market. The electric-power/point management server 200 makes use of the average price of electric power as a reference in the computation of the point rate. The average price of electric power is computed as typically a unit price per unit electric power.

Figure 6:
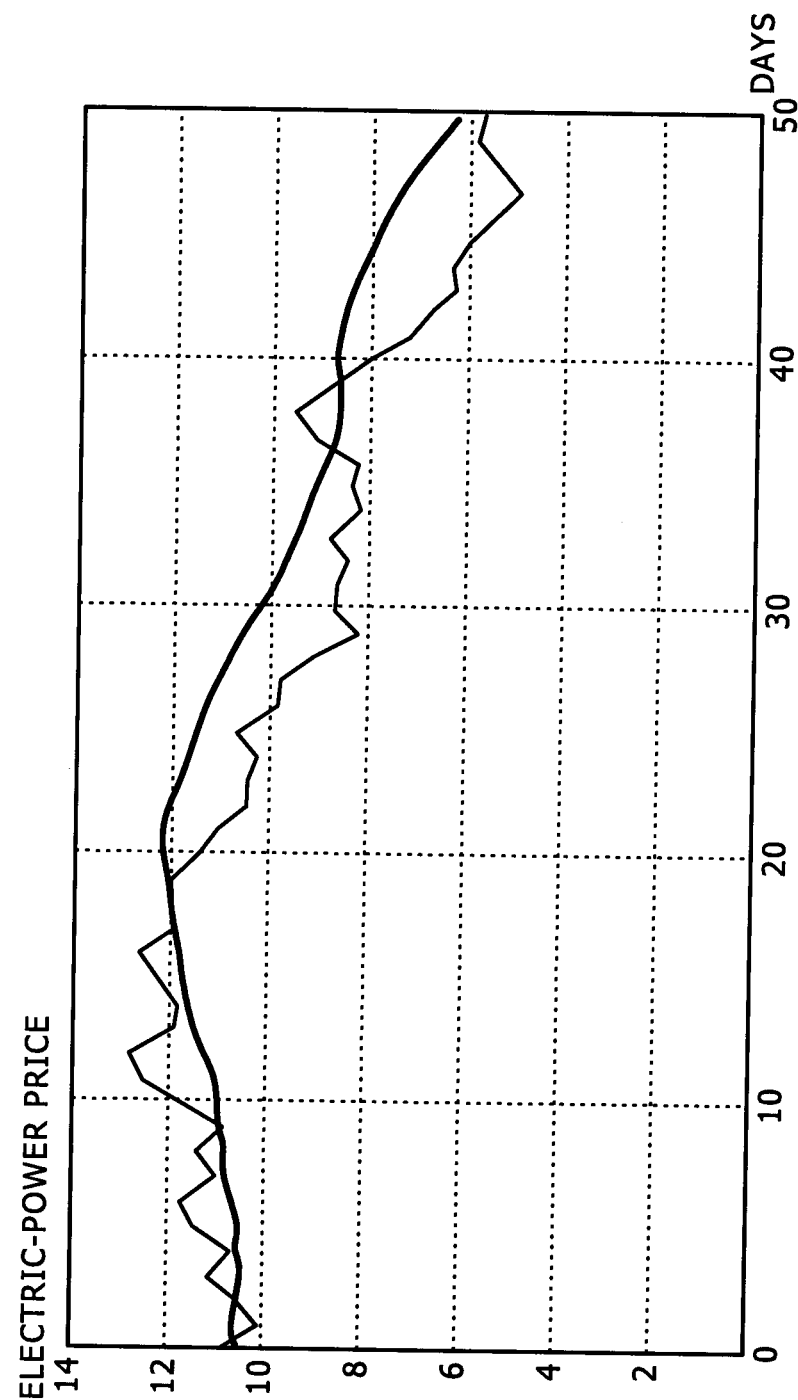
FIG. 6 is an explanatory diagram to be referred to in description of typical computation of an average value of electric-power prices.

A variety of methods can be adopted to compute the average price of electric power. FIGS. 6 and 7 are each an explanatory diagram referred to in the following description of typical computation of the average price of electric power. In FIG. 6, the vertical axis represents the price of electric power whereas the horizontal axis represents the number of days. FIG. 6 shows typical computation of the moving average price of electric power for 10 consecutive days. A thin line shows the electric-power prices in the electric-power transaction market whereas a bold line shows the moving average electric-power prices. In this case, the point rate also changes. However, the changes of the point rate are small in comparison with the changes of the price of electric power in the electric-power transaction market. It is thus possible to reduce the price change risk caused by the changes of the price of electric power in the electric-power transaction market.

For example, it is possible to provide a configuration in which the point rate is determined at 00:00 in the midnight and the point rate is used in the following period of 24 hours. It is to be noted that the point rate can also be determined at fixed time intervals determined in advance and a most recently determined point rate is used till the next point rate following the most recently determined point rate is determined. For example, the point rate is determined once a week, once a month or once a year.

In the case of the typical example shown in FIG. 7, at 10-day intervals, an average price of electric power is computed from the day-to-day market prices for the past 10 days, and the average price of electric power is used as the reference in the computation of the point rate for the following time period of 10 days. A thin line shows the day-to-day electric-power prices in the electric-power transaction market whereas a bold line shows the average of the electric-power prices. Also in this case, the changes of the point rate are small in comparison with the changes of the price of electric power in the electric-power transaction market. It is thus possible to reduce the price change risk caused by the changes of the price of electric power in the electric-power transaction market. The average computation interval and the average computation time period are by no means limited to the length of 10 days. For example, the average computation interval and the average computation time period can also have a length of one week, one month or one year.

The average electric-power price computed as described above is converted into a point rate on the basis of the goods/service rate. Thus, the amount of electric power accumulated in the electric-power accumulation battery module 30 and the point rate are determined.

If the number points required in an exchange for a 1,000-yen gift coupon used as a goods/service is 100 for example, the goods/service rate is one point per 10 yen. In addition, let the average electric-power price of electric-power market prices for a time period determined in advance be 10 yen per 1 kwh. In this case, the point rate is one point per 1 kwh. If electric power of 1 kwh has been accumulated in the electric-power accumulation facility 100, one point is given to the owner of the electric-power accumulation facility 100. However, this rate is a typical value used merely for the aim of explanation.

As described above, an average price of electric power is computed from the electric-power transaction market price changing in the electric-power transaction market and a point rate is set by taking the average price of electric power as a reference. Thus, the changes of the point rate can be made small in comparison with the changes of the price of electric power in the electric-power transaction market. Accordingly, it is possible to prevent the owner of the electric-power accumulation facility 100 from incurring the risk of the changes of the electric-power price. Therefore, it is possible to provide not only business enterprises with an incentive for introducing electric-power accumulation facilities in the enterprises, but also ordinary homes with the incentive for introducing electric-power accumulation facilities at the homes.

In addition, if an individual contract has been made between the owner of the electric-power accumulation facility 100 and the point issuer as described above, the contents of the contract can also be used as a reference in the determination of the point rate. The contents of an individual contract typically include a contract item as to whether or not the accumulation of electric power into the electric-power accumulation battery module 30 is carried out only at night when the price of the electric power is low, whether or not the electric power accumulated in the electric-power accumulation battery module 30 can be used by the owner of the electric-power accumulation facility 100 in the so-called private-home electric-power consumption and whether or not the electric power accumulated in the electric-power accumulation battery module 30 can be sold by the owner of the electric-power accumulation facility 100 to the electric-power transaction market with a high degree of freedom in accordance with the will of the owner.

Basically, in the case of a contract providing the owner of the electric-power accumulation facility 100 only with a low degree of freedom, it is desirable to set the point rate at a high value in order to allow the owner of the electric-power accumulation facility 100 to gain a bigger profit. In the case of a contract providing the owner of the electric-power accumulation facility 100 only with a low degree of freedom, the electric power accumulated in the electric-power accumulation battery module 30 cannot be used by the owner of the electric-power accumulation facility 100 in the so-called private-home electric-power consumption, the electric power accumulated in the electric-power accumulation battery module 30 cannot be sold by the owner of the electric-power accumulation facility 100 to the electric-power transaction market with a high degree of freedom in accordance with the will of the owner and electric power cannot be purchased by the owner of the electric-power accumulation facility 100 from the electric-power transaction market with a high degree of freedom in accordance with the will of the owner. That is to say, the electric power accumulated in the electric-power accumulation battery module 30 can only be sold to the electric-power transaction market entirely in accordance with management carried out by the electric-power/point management server 200 provided on the point-issuer side and electric power can only be purchased from the electric-power transaction market entirely in accordance with the management carried out by the electric-power/point management server 200. In this case, the decision to sell and purchase electric power is all made by the electric-power/point management server 200 and, since the will of the owner of the electric-power accumulation facility 100 is not reflected in the process of making such a decision, it is desirable to set the point rate at a high value.

In the case of a contract providing the owner of the electric-power accumulation facility 100 with a high degree of freedom, on the other hand, it is desirable to set the point rate at a low value in order to give more advantages to the point issuer. If the contract prescribes that the electric power accumulated in the electric-power accumulation battery module 30 can be used by the owner of the electric-power accumulation facility 100 in the so-called private-home electric-power consumption for example, there may be a case in which the amount of electric power accumulated in the electric-power accumulation battery module 30 is smaller than the amount of electric power intended for a sale to the electric-power transaction market even if the point issuer wants to sell the electric power accumulated in the electric-power accumulation battery module 30 to the electric-power transaction market. Thus, in such a case, it is desirable to set the point rate at a low value in order to give more advantages to the point issuer.

The reader is requested to refer back to the flowchart shown in FIG. 5. At the next step S23, the electric-power/point management server 200 determines whether or not the present amount of electric power accumulated in the electric-power accumulation battery module 30 is greater than the previously acquired amount of electric power accumulated in the electric-power accumulation battery module 30. If the electric-power/point management server 200 determines at the step S23 that the present amount of electric power accumulated in the electric-power accumulation battery module 30 is greater than the previously acquired amount of electric power accumulated in the electric-power accumulation battery module 30, that is, if the result of the determination process carried out at the step S23 is Yes, the flow of the processing represented by this flowchart goes on to a step S24.

Then, at the step S24, the point issuance section 223 issues points on the basis of the point rate determined at the step S22 in order to increase the number of points given to the owner of the electric-power accumulation facility 100. It is to be noted that the number of points issued at this time does not correspond to the present amount of electric power accumulated in the electric-power accumulation battery module 30, but corresponds to the increase of the present amount of electric power accumulated in the electric-power accumulation battery module 30 from the previously acquired amount of electric power accumulated in the electric-power accumulation battery module 30. It is possible to provide a configuration in which the point issuance section 223 manages not only point information showing the present number of points given so far to the owner of the electric-power accumulation facility 100, but also information such as the history of point increases. In addition, the electric-power/point management server 200 may transmit the point information to the electrical-charging/discharging control apparatus 10 through the communication network and the communication section 12.

If the electric-power/point management server 200 determines at the step S23 that the present amount of electric power accumulated in the electric-power accumulation battery module 30 is not greater than the previously acquired amount of electric power accumulated in the electric-power accumulation battery module 30, that is, if the result of the determination process carried out at the step S23 is No, on the other hand, the flow of the processing represented by this flowchart goes on to a step S25. At the step S25, the electric-power/point management server 200 determines whether or not the present amount of electric power accumulated in the electric-power accumulation battery module 30 is smaller than the previously acquired amount of electric power accumulated in the electric-power accumulation battery module 30. If the electric-power/point management server 200 determines at the step S25 that the present amount of electric power accumulated in the electric-power accumulation battery module 30 is not smaller than the previously acquired amount of electric power accumulated in the electric-power accumulation battery module 30, that is, if the result of the determination process carried out at the step S25 is No, the flow of the processing represented by this flowchart goes on to a step S26.

As is obvious from the above description, if the electric-power/point management server 200 determines at the step S23 that the present amount of electric power accumulated in the electric-power accumulation battery module 30 is not greater than the previously acquired amount of electric power accumulated in the electric-power accumulation battery module 30 and if the electric-power/point management server 200 determines at the step S25 that the present amount of electric power accumulated in the electric-power accumulation battery module 30 is not smaller than the previously acquired amount of electric power accumulated in the electric-power accumulation battery module 30, the flow of the processing represented by this flowchart goes on to the step S26. At the step S26, the number of points given to the owner of the electric-power accumulation facility 100 is neither increased nor decreased.

The reader is advised to refer back to the step S25. If the electric-power/point management server 200 determines at the step S25 that the present amount of electric power accumulated in the electric-power accumulation battery module 30 is smaller than the previously acquired amount of electric power accumulated in the electric-power accumulation battery module 30, that is, if the result of the determination process carried out at the step S25 is Yes, on the other hand, the flow of the processing represented by this flowchart goes on to a step S27. At the step S27, the electric-power/point management server 200 determines whether or not the decrease of the amount of electric power accumulated in the electric-power accumulation battery module 30 has been caused by a transaction to sell electric power to the electric-power transaction market in accordance with a command issued by the electric-power/point management server 200.

If the electric-power/point management server 200 determines at the step S27 that the decrease of the amount of electric power accumulated in the electric-power accumulation battery module 30 has not been caused by a transaction to sell electric power to the electric-power transaction market in accordance with a command issued by the electric-power/point management server 200, that is, if the result of the determination process carried out at the step S27 is No, the flow of the processing represented by this flowchart goes on to a step S28. Then, at the step S28, the point issuance section 223 issues negative points in order to decrease the number of points given to the owner of the electric-power accumulation facility 100.

The decrease of the amount of electric power accumulated in the electric-power accumulation battery module 30 is determined by the electric-power/point management server 200 to have not been caused by a transaction to sell electric power to the electric-power transaction market in accordance with a command issued by the electric-power/point management server 200 if the owner of the electric-power accumulation facility 100 has consumed electric power accumulated in the electric-power accumulation battery module 30 in private-home electric-power consumption, decreasing the amount of electric power accumulated in the electric-power accumulation battery module 30 or if the owner of the electric-power accumulation facility 100 has sold electric power accumulated in the electric-power accumulation battery module 30 in accordance with the will of the owner itself, decreasing the amount of electric power accumulated in the electric-power accumulation battery module 30. In this case, the electric-power/point management server 200 determines that the amount of electric power accumulated in the electric-power accumulation battery module 30 as electric power that can be sold by the point issuer to the electric-power transaction market has been decreased by the owner of the electric-power accumulation facility 100 so that the point issuance section 223 issues negative points in order to decrease the number of points given to the owner of the electric-power accumulation facility 100.

If the electric-power/point management server 200 determines at the step S27 that the decrease of the amount of electric power accumulated in the electric-power accumulation battery module 30 has been caused by a transaction to sell electric power to the electric-power transaction market in accordance with a command issued by the electric-power/point management server 200, that is, if the result of the determination process carried out at the step S27 is Yes, on the other hand, the flow of the processing represented by this flowchart goes on to the step S26. The fact that the decrease of the amount of electric power accumulated in the electric-power accumulation battery module 30 has been caused by a transaction to sell electric power to the electric-power transaction market in accordance with a command issued by the electric-power/point management server 200 indicates that the point issuer has gained a profit. Thus, an operation to reduce the number of points given to the owner of the electric-power accumulation facility 100 in such a case is irrational. It is to be noted that in the case of a contract not allowing the owner of the electric-power accumulation facility 100 to consume electric power accumulated in the electric-power accumulation battery module 30 in private-home electric-power consumption, the determination process of the step S27 is not required.

The processing to issue points to the owner of the electric-power accumulation facility 100 is carried out as described above. Next, by referring to FIG. 8, the processing to issue points to the owner of the electric-power accumulation facility 100 is further exemplified by giving a typical concrete example as follows.

FIG. 8 is a diagram showing a graph referred to in the following description of a concrete typical example of the point issuance processing. In this figure, the vertical axis represents the amount of electric power accumulated in the electric-power accumulation battery module 30 whereas the horizontal axis represents the lapse of time. The graph represents accumulated electric-power changes occurring during a certain period of time. Each arrow extended in the downward direction to cross the horizontal axis points to a time at which the point issuance processing is carried out. As shown by such arrows, an operation to acquire information on the amount of electric power accumulated in the electric-power accumulation battery module 30 and the point issuance processing based on such information are carried out periodically. It is to be noted that, in order to make the following explanation easy to understand, the point rate is set at one point per 1 kwh of accumulated electric power.

First of all, at the beginning of period (1), when the electric-power/point management server 200 transmits an electrical charging command making a request for an electrical charging operation to the electrical-charging/discharging control apparatus 10, electric power purchased from the electric-power transaction market is accumulated in the electric-power accumulation battery module 30. Then, at the beginning of period (2), when the electric-power/point management server 200 transmits a stop command making a request to stop the electrical charging operation to the electrical-charging/discharging control apparatus 10, the electric-power accumulation facility 100 stops the electrical charging operation. Before the electrical charging operation carried out in period (1) is stopped, the point issuance processing is carried out twice as first point issuance processing and second point issuance processing.

At the first point issuance processing, two points are given to the owner of the electric-power accumulation facility 100 because the amount of electric power accumulated in the electric-power accumulation battery module 30 has been increased by 2 kwh from an initial value of 0 kwh. Then, at the second point issuance processing, two points are further added to the two points already given to the owner of the electric-power accumulation facility 100 because the amount of electric power accumulated in the electric-power accumulation battery module 30 has been increased by 2 kwh from the accumulated electric-power amount obtained at the first point issuance processing.

Then in subsequent period (2) which is a stopped-operation period, third point issuance processing is carried out. At the third point issuance processing, one point is further added because the amount of electric power accumulated in the electric-power accumulation battery module 30 has been increased by 1 kwh from the accumulated electric-power amount obtained at the second point issuance processing.

Subsequently, at the beginning of period (3), when the electric-power/point management server 200 again transmits an electrical charging command making a request for an electrical charging operation to the electrical-charging/discharging control apparatus 10, electric power purchased from the electric-power transaction market is accumulated in the electric-power accumulation battery module 30. In period (3) during which purchased electric power is being accumulated in the electric-power accumulation battery module 30, the point issuance processing is carried out twice as fourth point issuance processing and fifth point issuance processing. At the fourth point issuance processing, one point is further added because the amount of electric power accumulated in the electric-power accumulation battery module 30 has been increased by 1 kwh from the accumulated electric-power amount obtained at the third point issuance processing. Then, at the fifth point issuance processing, two points are further added because the amount of electric power accumulated in the electric-power accumulation battery module 30 has been increased by 2 kwh from the accumulated electric-power amount obtained at the fourth point issuance processing.

Subsequently, at the beginning of period (4), when the electric-power/point management server 200 transmits an electric-power selling command serving as an electrical discharging command making a request for an electrical discharging operation to the electrical-charging/discharging control apparatus 10, electric power accumulated in the electric-power accumulation battery module 30 is electrically discharged from the electric-power accumulation battery module 30 and sold to the electric-power transaction market. Thus, the amount of electric power accumulated in the electric-power accumulation battery module 30 decreases.

It is to be noted that, in the case of a command making a request for an electric-power sale, in order to obtain information on the amount of electric power that can be sold to the electric-power transaction market and information on the amount of electric power already sold to the electric-power transaction market with a high degree of accuracy, it is preferable to let the electric-power/point management server 200 acquire information on the amount of electric power accumulated in the electric-power accumulation battery module 30 immediately before the electric-power sale and information on the amount of electric power accumulated in the electric-power accumulation battery module 30 right after the electric-power sale separately from the operation carried out to acquire information on the amount of electric power accumulated in the electric-power accumulation battery module 30 in order to issue points.

At the end of period (4), sixth point issuance processing is carried out. At the sixth point issuance processing, the amount of electric power accumulated in the electric-power accumulation battery module 30 is decreased by 6 kwh from the accumulated electric-power amount obtained at the fifth point issuance processing. However, points are neither added to the points already given so far to the owner of the electric-power accumulation facility 100 nor subtracted from the points already given so far to the owner of the electric-power accumulation facility 100 due to the decrease of the amount of electric power accumulated in the electric-power accumulation battery module 30. This is because the amount of electric power accumulated in the electric-power accumulation battery module 30 has been decreased by 6 kwh at a request made by the electric-power/point management server 200.

Subsequently, at the beginning of period (5), when the electric-power/point management server 200 again transmits an electrical charging command making a request for an electrical charging operation to the electrical-charging/discharging control apparatus 10, electric power purchased from the electric-power transaction market is accumulated in the electric-power accumulation battery module 30, increasing the amount of electric power accumulated in the electric-power accumulation battery module 30. In period (5) during which purchased electric power is being accumulated in the electric-power accumulation battery module 30, seventh point issuance processing is carried out. At the seventh point issuance processing, two points are further added because the amount of electric power accumulated in the electric-power accumulation battery module 30 has been increased by 2 kwh from the accumulated electric-power amount obtained at the sixth point issuance processing.

Subsequently, at the beginning of period (6), the owner of the electric-power accumulation facility 100 consumes electric power accumulated in the electric-power accumulation facility 100 in the so-called private-home electric-power consumption. In period (6), the point issuance processing is carried out twice as eighth point issuance processing and ninth point issuance processing. At the eighth point issuance processing, the number of points given so far to the owner of the electric-power accumulation facility 100 is not changed because the amount of electric power accumulated in the electric-power accumulation battery module 30 remains equal to the accumulated electric-power amount obtained at the seventh point issuance processing. Then, at the ninth point issuance processing, two points are subtracted from the number of points given so far to the owner of the electric-power accumulation facility 100. This is because the amount of electric power accumulated in the electric-power accumulation battery module 30 has been decreased by 2 kwh from the accumulated electric-power amount obtained at the eighth point issuance processing due to the so-called private-home electric-power consumption.

Subsequently, at the beginning of period (7), when the electric-power/point management server 200 again transmits an electrical charging command making a request for an electrical charging operation to the electrical-charging/discharging control apparatus 10, electric power purchased from the electric-power transaction market is accumulated in the electric-power accumulation battery module 30, increasing the amount of electric power accumulated in the electric-power accumulation battery module 30.

The reader is advised to keep in mind that it is possible to provide a configuration in which, when the operating mode of the electric-power accumulation facility 100 is changed to a private-home electric-power consumption mode, the control section 11 stores the operating mode prior to the private-home electric-power consumption mode and, as the private-home electric-power consumption mode is finished, the electric-power accumulation facility 100 returns back to the operating mode prior to the private-home electric-power consumption mode if no command is newly received from the electric-power/point management server 200.

In period (7), tenth point issuance processing is carried out. At the tenth point issuance processing, the number of points given so far to the owner of the electric-power accumulation facility 100 is not changed because the amount of electric power accumulated in the electric-power accumulation battery module 30 remains equal to the accumulated electric-power amount obtained at the ninth point issuance processing.

The electric-power/point management server 200 carries out the point issuance processing as described above.

1-6: Processing of the Electrical-Charging/Discharging Control Apparatus

Next, electrical charging/discharging control processing carried out by the electrical-charging/discharging control apparatus 10 is explained. FIG. 9 shows a flowchart representing the electrical-charging/discharging control processing carried out by the electrical-charging/discharging control apparatus 10. As described before, in actuality, the electrical-charging/discharging control processing is carried out by the control section 11 of the electrical-charging/discharging control apparatus 10 in accordance with a command received from the electric-power/point management server 200.

As shown in FIG. 9, the flowchart begins with a step S31 at which the electrical-charging/discharging control apparatus 10 determines whether or not a command has been received from the electric-power/point management server 200. If the electrical-charging/discharging control apparatus 10 determines at the step S31 that no command has been received from the electric-power/point management server 200, that is, if the result of the determination process carried out at the step S31 is No, the electrical-charging/discharging control processing is not carried out. If the electrical-charging/discharging control apparatus 10 determines at the step S31 that a command has been received from the electric-power/point management server 200, that is, if the result of the determination process carried out at the step S31 is Yes, on the other hand, the flow of the electrical-charging/discharging control processing goes on to a step S32 at which the electrical-charging/discharging control apparatus 10 determines whether or not the electric-power accumulation facility 100 is carrying out an operation in accordance with a command received from the owner of the electric-power accumulation facility 100.

If the electrical-charging/discharging control apparatus 10 determines at the step S32 that the electric-power accumulation facility 100 is carrying out an operation in accordance with a command received from the owner of the electric-power accumulation facility 100, that is, if the result of the determination process carried out at the step S32 is Yes, the flow of the electrical-charging/discharging control processing goes on to a step S33 at which the electrical-charging/discharging control apparatus 10 determines whether or not the contract made between the owner of the electric-power accumulation facility 100 and the point issuer is a contract allowing the command issued by the owner of the electric-power accumulation facility 100 to take precedence over commands issued by the electric-power/point management server 200. The electrical-charging/discharging control apparatus 10 is capable of determining whether or not the contract made between the owner of the electric-power accumulation facility 100 and the point issuer is a contract allowing the command issued by the owner of the electric-power accumulation facility 100 to take precedence over commands issued by the electric-power/point management server 200 typically by referring to contract information stored in the storage section 23 as information describing the contents of the contract made between the owner of the electric-power accumulation facility 100 and the point issuer. Instead of referring to the contract information stored in the storage section 23, the electrical-charging/discharging control apparatus 10 may make an access to the electric-power/point management server 200 through the communication network in order to refer to contract information stored in the facility-owner database 230 included in the electric-power/point management server 200. If the electrical-charging/discharging control apparatus 10 determines at the step S33 that the contract made between the owner of the electric-power accumulation facility 100 and the point issuer is a contract allowing the command issued by the owner of the electric-power accumulation facility 100 to take precedence over commands issued by the electric-power/point management server 200, that is, if the result of the determination process carried out at the step S33 is Yes, the electrical-charging/discharging control processing is ended because the electric-power accumulation facility 100 is currently not capable of carrying out any operation control according to a command received from the electric-power/point management server 200.

If the electrical-charging/discharging control apparatus 10 determines at the step S33 that the contract made between the owner of the electric-power accumulation facility 100 and the point issuer is not a contract allowing the command issued by the owner of the electric-power accumulation facility 100 to take precedence over commands issued by the electric-power/point management server 200, that is, if the result of the determination process carried out at the step S33 is No, on the other hand, the flow of the electrical-charging/discharging control processing goes on to a step S34. In addition, if the electrical-charging/discharging control apparatus 10 determines at the step S32 that the electric-power accumulation facility 100 is not carrying out an operation in accordance with a command received from the owner of the electric-power accumulation facility 100, that is, if the result of the determination process carried out at the step S32 is No, on the other hand, the flow of the electrical-charging/discharging control processing also goes on to the step S34.

At the step S34, the electrical-charging/discharging control apparatus 10 determines whether or not the command received from the electric-power/point management server 200 is an electrical-charging command. If the electrical-charging/discharging control apparatus 10 determines at the step S34 that the command received from the electric-power/point management server 200 is an electrical-charging command, that is, if the result of the determination process carried out at the step S34 is Yes, the flow of the electrical-charging/discharging control processing goes on to a step S35 at which the power conditioner 13 is driven to operate in an electrical-charging mode. Thus, electric power purchased from the electric-power transaction market is accumulated in the electric-power accumulation battery module 30.

If the electrical-charging/discharging control apparatus 10 determines at the step S34 that the command received from the electric-power/point management server 200 is not an electrical-charging command, that is, if the result of the determination process carried out at the step S34 is No, on the other hand, the flow of the electrical-charging/discharging control processing goes on to a step S36 at which the electrical-charging/discharging control apparatus 10 determines whether or not the command received from the electric-power/point management server 200 is an electrical-discharging command.

If the electrical-charging/discharging control apparatus 10 determines at the step S36 that the command received from the electric-power/point management server 200 is an electrical-discharging command, that is, if the result of the determination process carried out at the step S36 is Yes, the flow of the electrical-charging/discharging control processing goes on to a step S37 at which the power conditioner 13 is driven to operate in an electrical-discharging mode. Thus, electric power is electrically discharged from the electric-power accumulation battery module 30 and sold to the electric-power transaction market.

If the electrical-charging/discharging control apparatus 10 determines at the step S36 that the command received from the electric-power/point management server 200 is not an electrical-discharging command, that is, if the result of the determination process carried out at the step S36 is No, on the other hand, the flow of the electrical-charging/discharging control processing goes on to a step S38. Since the command received from the electric-power/point management server 200 is neither an electrical-charging command nor an electrical-discharging command, the command received from the electric-power/point management server 200 has to be a stop command. Thus, at the step S38, the power conditioner 13 is driven to operate in a stop mode.

As described above, the electrical-charging/discharging control apparatus 10 carries out the electrical-charging/discharging control processing in accordance with which command has been received from the electric-power/point management server 200.

It is to be noted that if the contract made between the owner of the electric-power accumulation facility 100 and the point issuer is a contract not allowing the owner to operate the electric-power accumulation facility 100 by issuing a command by itself to the electric-power accumulation facility 100, the determination processes of the steps S32 and S33 are not required.

In addition, let the contract made between the owner of the electric-power accumulation facility 100 and the point issuer be a contract allowing the command issued by the owner of the electric-power accumulation facility 100 to take precedence over commands issued by the electric-power/point management server 200. In this case, if the owner of the electric-power accumulation facility 100 gives a command to the electric-power accumulation facility 100 while the electric-power accumulation facility 100 is carrying out an operation, the electric-power accumulation facility 100 is forced to carry out another operation requested by the command issued by the owner. If the contract made between the owner of the electric-power accumulation facility 100 and the point issuer is a contract not allowing the command issued by the owner of the electric-power accumulation facility 100 to take precedence over commands issued by the electric-power/point management server 200, on the other hand, the electric-power accumulation facility 100 continues an operation being carried out thereby so far without regard to a command given by the owner of the electric-power accumulation facility 100 to the electric-power accumulation facility 100.

The electrical charging/discharging processing and the point issuance processing are carried out in accordance with the present disclosure as described above. However, transactions carried out in the contemporary electric-power transaction market are limited to big transactions. Thus, by merely having electric power accumulated in a small-scale electric-power accumulation facility 100 like one installed at an ordinary home for example, the owner of the electric-power accumulation facility 100 cannot participate in the present electric-power transaction market. For example, the transaction unit used in the Japanese electric-power transaction market is an electric power of 1,000 kw and a time period of 30 minutes. Thus, the smallest amount of electric energy that can be treated as a transaction object is an energy of 500 kwh. On the other hand, the electric-power accumulation capacity of a home electric-power accumulation battery is not greater than a capacity of about several tens of kwh and its output is not greater than a value of about several kw. Thus, even if the electric-power accumulation facility 100 is introduced at more and more ordinary homes or the like, it is difficult for an ordinary home or the like to participate in the electric-power transaction market by itself. This difficulty serves as one of barriers against participation of an ordinary home or the like in the electric-power transaction market.

In this present disclosure, it is desirable to provide a configuration in which the point issuer owning the electric-power/point management server 200 manages a number of facility owners each having an electric-power accumulation facility 100. In addition, transactions to sell and purchase electric power between a number of electric-power accumulation facilities 100 and the electric-power transaction market are carried out under the management of the electric-power/point management server 200. Thus, by collectively carrying out the electric-power purchasing and selling transactions for the numerous electric-power accumulation facilities 100, the number of electric-power purchasing and selling transactions can be increased to a number as if a big electric-power transaction were being performed. As a result, by treating a number of facility owners each having an electric-power accumulation facility 100 as a group, a large electric-power purchasing and selling transaction can be carried out under an advantageous condition even for a case in which a small-transaction participant has difficulties to join the electric-power transaction market.

Even though the electric-power accumulation facility 100 is owned by a facility owner, the electric-power purchasing and selling transactions by the electric-power electrical charging and discharging operations are carried out under management executed by the electric-power/point management server 200. In addition, the electric-power/point management server 200 also carries out transactions to purchase and sell electric power in the electric-power transaction market for the electric-power accumulation facility 100 on the basis of the price of electric power in the market. On top of that, the point issuer owning the electric-power/point management server 200 provides the owner of the electric-power accumulation facility 100 with points according to the amount of electric power accumulated in the electric-power accumulation battery module 30 employed in the electric-power accumulation facility 100. Thus, the owner of the electric-power accumulation facility 100 can gain a profit from the received points according to the amount of electric power accumulated in the electric-power accumulation battery module 30 without becoming concerned about the price of electric power in the electric-power transaction market and without incurring a risk of fluctuations in electric-power price. As a result, since it is possible to prevent the owner of the electric-power accumulation facility 100 from incurring a price-change risk caused by electric-power price fluctuations in the electric-power transaction market, introduction of the electric-power accumulation facility 100 in the entire society can be promoted.

In addition, in accordance with the present disclosure, the point issuer sells electric power to the electric-power transaction market with a proper timing and at a proper price in order to gain a profit. Thus, by making use of the electric-power management system according the embodiment of to the present disclosure, the point issuer can cover the cost of managing the system.

On top of that, by utilizing the present disclosure, it is possible to bring about a big profit to the goods/service provider which provides goods and services. In general, commercial goods/services taking the environment into consideration are rather expensive in comparison with ordinary commercial goods/services. A customer buying such relatively expensive commercial goods/services is regarded as a customer who is highly conscious of the environment.

If the owner of the electric-power accumulation facility 100 participates in the electric-power management system according to an embodiment of the present disclosure, the owner of the electric-power accumulation facility 100 is regarded as a person who is highly conscious of the environment. Thus, if an enterprise desiring to sell environmental commercial goods/services becomes a goods/service provider, the enterprise may expect increased sales. In addition, even if an enterprise does not handle environmental commercial goods/services, participation of the enterprise in the electric-power management system according to an embodiment of the present disclosure is by itself considered as contribution to environmental activities. Thus, the environment consideration by the enterprise makes an appeal to society.

The present disclosure demonstrates a variety of effects described above. Thus, every person participating in the electric-power management system according to an embodiment of the present disclosure can get an advantage for the person itself. As a result, the introduction of the electric-power accumulation facility 100 in society can be promoted.

2: Modified Versions

An embodiment of the present disclosure has been described so far. However, implementations of the present disclosure are by no means limited to the embodiment described above. That is to say, a variety of changes based on the concept of the present disclosure can be made to the embodiment to further provide the present disclosure with modified versions and implementations including the following:

1: An electrical-charging/discharging control apparatus composing an electric-power accumulation facility in conjunction with an electric-power accumulation battery and including:

a communication section configured to receive a command to carry out either of electrical charging and discharging operations on the electric-power accumulation battery from an electric-power management apparatus for managing the electrical charging and discharging operations carried out on the electric-power accumulation battery;

a control section configured to control the electrical charging and discharging operations carried out on the electric-power accumulation battery on the basis of the command; and a power conditioner for supplying electric power from an electric-power network to the electric-power accumulation battery and transferring electric power accumulated in the electric-power accumulation battery to the electric-power network in accordance with control carried out by the control section.

2: The electrical-charging/discharging control apparatus according to implementation 1 wherein the communication section transmits electric-power accumulation information showing the amount of electric power accumulated in the electric-power accumulation battery to the electric-power management apparatus.

3: The electrical-charging/discharging control apparatus according to implementation 1 or 2 wherein the control section controls the electrical charging and discharging operations carried out on the electric-power accumulation battery by changing an operation of the power conditioner on the basis of the command.

4: An electric-power management apparatus including:

a communication section configured to receive electric-power accumulation information showing the amount of electric power accumulated in an electric-power accumulation battery from an electrical-charging/discharging control apparatus composing an electric-power accumulation facility in conjunction with the electric-power accumulation battery; and a point issuance section configured to issue points, which correspond to an amount shown by the electric-power accumulation information as the amount of electric power accumulated in the electric-power accumulation battery, for every aforementioned electric-power accumulation facility.

5: The electric-power management apparatus according to implementation 4, the electric-power management apparatus further having an electric-power management section configured to issue a command to transfer electric power accumulated in the electric-power accumulation battery to an electric-power network and a command to supply electric power from the electric-power network to the electric-power accumulation battery, wherein the communication section transmits the commands issued by the electric-power management section to the electrical-charging/discharging control apparatus (as commands to carry out electrical charging and discharging operations on the electric-power accumulation battery).

6: The electric-power management apparatus according to implementation 4 or 5 wherein the point issuance section increases the number of aforementioned points already given to the electric-power accumulation facility if the amount shown by the electric-power accumulation information as the amount of electric power accumulated in the electric-power accumulation battery increases.

7: The electric-power management apparatus according to any one of implementations 4 to 6 wherein the point issuance section decreases the number of aforementioned points already given to the electric-power accumulation facility if the amount shown by the electric-power accumulation information as the amount of electric power accumulated in the electric-power accumulation battery decreases due to electric-power consumption desired by the owner of the electric-power accumulation facility.

8: The electric-power management apparatus according to any one of implementations 4 to 7 wherein the point issuance section neither increases nor decreases the number of aforementioned points already given to the electric-power accumulation facility if the amount shown by the electric-power accumulation information as the amount of electric power accumulated in the electric-power accumulation battery decreases due to an electrical discharging command given by the electric-power management section (to serve as the command to transfer electric power accumulated in the electric-power accumulation battery to the electric-power network).

9: The electric-power management apparatus according to any one of implementations 5 to 8 wherein the electric-power management section provides the electrical-charging/discharging control apparatus with a command to transfer electric power accumulated in the electric-power accumulation battery to the electric-power network or a command to supply electric power from the electric-power network to the electric-power accumulation battery on the basis of the price of electric power in an electric-power transaction market.

10: The electric-power management apparatus according to implementation 9 wherein the electric-power management section provides the electrical-charging/discharging control apparatus with a command to supply electric power from the electric-power network to the electric-power accumulation battery if the price of electric power in the electric-power transaction market is lower than a price determined in advance.

11: The electric-power management apparatus according to implementation 9 or 10 wherein the electric-power management section provides the electrical-charging/discharging control apparatus with a command to transfer electric power accumulated in the electric-power accumulation battery to the electric-power network if the price of electric power in the electric-power transaction market is higher than the price determined in advance.

12: The electric-power management apparatus according to any one of implementations 4 to 11, the electric-power management apparatus further having a point-rate determination section configured to determine a rate between the amount of electric power accumulated in the electric-power accumulation battery and the points.

13: The electric-power management apparatus according to implementation 12 wherein the point-rate determination section determines the rate on the basis of an average value of the prices of electric power in the electric-power transaction market.

14: An electric-power management method including:
receiving electric-power accumulation information showing the amount of electric power accumulated in an electric-power accumulation battery from an electrical-charging/discharging control apparatus composing an electric-power accumulation facility in conjunction with the electric-power accumulation battery (and transmitting a command to the electrical-charging/discharging control apparatus to carry out an electrical charging or discharging operation on the electric-power accumulation battery); and
issuing points, which correspond to an amount shown by the electric-power accumulation information as the amount of electric power accumulated in the electric-power accumulation battery, for every aforementioned electric-power accumulation facility.

15: An electric-power management system including:
an electrical-charging/discharging control apparatus composing an electric-power accumulation facility in conjunction with an electric-power accumulation battery and having:
a communication section configured to receive a command to carry out either of electrical charging and discharging operations on the electric-power accumulation battery from an electric-power management apparatus for managing the electrical charging and discharging operations carried out on the electric-power accumulation battery and to transmit electric-power accumulation information showing the amount of electric power accumulated in the electric-power accumulation battery to the electric-power management apparatus;
a control section configured to control the electrical charging and discharging operations carried out on the electric-power accumulation battery on the basis of the command; and
a power conditioner for supplying electric power from an electric-power network to the electric-power accumulation battery and transferring electric power accumulated in the electric-power accumulation battery to the electric-power network in accordance with control carried out by the control section; and
the electric-power management apparatus having:
a communication section configured to receive the electric-power accumulation information showing the amount of electric power accumulated in the electric-power accumulation battery from the electrical-charging/discharging control apparatus (and for transmitting a command to the electrical-charging/discharging control apparatus to carry out an electrical charging or discharging operation on the electric-power accumulation battery);
a point issuance section configured to issue points, which correspond to an amount shown by the electric-power accumulation information as the amount of electric power accumulated in the electric-power accumulation battery, for every aforementioned electric-power accumulation facility; and
an electric-power management section configured to provide the electrical-charging/discharging control apparatus with (the command transmitted by the communication section to the electrical-charging/discharging control apparatus to serve as) a command to transfer electric power accumulated in the electric-power accumulation battery to the electric-power network or a command to supply electric power from the electric-power network to the electric-power accumulation battery.

The present disclosure contains subject matter related to that disclosed in Japanese Priority Patent Application JP 2011-073974 filed in the Japan Patent Office on Mar. 30, 2011, the entire content of which is hereby incorporated by reference.

What is claimed is:

1. An electrical-charging/discharging control apparatus of an electric-power accumulation facility that controls electric charging and discharging of an electric-power accumulation battery, said apparatus comprising:
a communication section configured to receive a command to carry out either electrical charging or discharging operations on said electric-power accumulation battery from an electric-power management apparatus for managing said electrical charging or discharging operations carried out on said electric-power accumulation battery;
a control section configured to control said electrical charging or discharging operations carried out on said electric-power accumulation battery on the basis of said command; and
a power conditioner for supplying electric power from an electric-power network to said electric-power accumulation battery when said electrical charging operations are carried out, and for transferring electric power accumulated in said electric-power accumulation battery to said electric-power network when said discharging operations are carried out, in accordance with control carried out by said control section.

2. The electrical-charging/discharging control apparatus according to claim 1 wherein said communication section transmits electric-power accumulation information showing the amount of electric power accumulated in said electric-power accumulation battery to said electric-power management apparatus.

3. The electrical-charging/discharging control apparatus according to claim 1 wherein said control section controls said electrical charging and discharging operations carried out on said electric-power accumulation battery by changing an operation of said power conditioner on the basis of said command.

4. An electric-power management apparatus comprising:
a communication section configured to receive electric-power accumulation information showing the amount of electric power accumulated in an electric-power accumulation battery from an electrical-charging/discharging control apparatus of an electric-power accumulation facility that controls electric charging and discharging of said electric-power accumulation battery; and
a point issuance section configured to issue transactionable points, which correspond to an amount shown by said electric-power accumulation information as said amount of electric power accumulated in said electric-power accumulation battery, to an owner of said electric-power accumulation facility, wherein said communication section and said point issuance section are each implemented via at least one processor.

5. The electric-power management apparatus according to claim 4, said electric-power management apparatus further comprising:
   an electric-power management section configured to issue a command to transfer electric power accumulated in said electric-power accumulation battery to an electric-power network and a command to supply electric power from said electric-power network to said electric-power accumulation battery,
   wherein said communication section transmits said commands issued by said electric-power management section to said electrical-charging/discharging control apparatus, and
   wherein said electric-power management section is implemented via at least one processor.

6. The electric-power management apparatus according to claim 5 wherein said point issuance section neither increases nor decreases the number of said transactionable points already issued to the owner of said electric-power accumulation facility if said amount shown by said electric-power accumulation information as said amount of electric power accumulated in said electric-power accumulation battery decreases due to an electrical discharging command issued by said electric-power management section.

7. The electric-power management apparatus according to claim 5 wherein said electric-power management section issues said command to transfer electric power accumulated in said electric-power accumulation battery to said electric-power network and said command to supply electric power from said electric-power network to said electric-power accumulation battery on the basis of the price of electric power in an electric-power transaction market.

8. The electric-power management apparatus according to claim 7 wherein said electric-power management section issues said command to supply electric power from said electric-power network to said electric-power accumulation battery if said price of electric power in said electric-power transaction market is lower than a price determined in advance.

9. The electric-power management apparatus according to claim 7 wherein said electric-power management section issues said command to transfer electric power accumulated in said electric-power accumulation battery to said electric-power network if said price of electric power in said electric-power transaction market is higher than a price determined in advance.

10. The electric-power management apparatus according to claim 4 wherein said point issuance section increases the number of said transactionable points already issued to the owner of said electric-power accumulation facility if said amount shown by said electric-power accumulation information as said amount of electric power accumulated in said electric-power accumulation battery increases.

11. The electric-power management apparatus according to claim 4 wherein said point issuance section decreases the number of said transactionable points already issued to the owner of said electric-power accumulation facility if said amount shown by said electric-power accumulation information as said amount of electric power accumulated in said electric-power accumulation battery decreases due to electric-power consumption desired by the owner of said electric-power accumulation facility.

12. The electric-power management apparatus according to claim 4, said electric-power management apparatus further comprising a point-rate determination section configured to determine a rate between said amount of electric power accumulated in said electric-power accumulation battery and said transactionable points, wherein said point-rate determination section is implemented via at least one processor.

13. The electric-power management apparatus according to claim 12 wherein said point-rate determination section determines said rate on the basis of an average value of said prices of electric power in said electric-power transaction market.

14. An electric-power management method comprising:
    receiving electric-power accumulation information showing the amount of electric power accumulated in an electric-power accumulation battery from an electric-power accumulation facility that controls electric charging and discharging of said electric-power accumulation battery; and
    issuing transactionable points, which correspond to an amount shown by said electric-power accumulation information as said amount of electric power accumulated in said electric-power accumulation battery, to an owner of said electric-power accumulation facility.

15. An electric-power management system comprising an electrical-charging/discharging control apparatus and an electric-power management apparatus,
    said electrical-charging/discharging control apparatus being of an electric-power accumulation facility that controls electric charging and discharging of an electric-power accumulation battery, wherein said electric-charging/discharging control apparatus comprises:
        a communication section configured to receive a command to carry out electrical charging or discharging operations on said electric-power accumulation battery from said electric-power management apparatus for managing said electrical charging or discharging operations carried out on said electric-power accumulation battery and transmit electric-power accumulation information showing the amount of electric power accumulated in said electric-power accumulation battery to said electric-power management apparatus,
        a control section configured to control said electrical charging or discharging operations carried out on said electric-power accumulation battery on the basis of said command, and
        a power conditioner for supplying electric power from an electric-power network to said electric-power accumulation battery when said electrical charging operations are carried out, and for transferring electric power accumulated in said electric-power accumulation battery to said electric-power network when said discharging operations are carried out, in accordance with control carried out by said control section;
    said electric-power management apparatus comprising:
        a communication section configured to receive said electric-power accumulation information showing said amount of electric power accumulated in said electric-power accumulation battery from said electrical-charging/discharging control apparatus,
        a point issuance section configured to issue transactionable points, which correspond to an amount shown by said electric-power accumulation information as said amount of electric power accumulated in said electric-power accumulation battery, to an owner of said electric-power accumulation facility, and
        an electric-power management section configured to provide said electrical-charging/discharging control apparatus with a command to transfer electric power accumulated in said electric-power accumulation battery to said electric-power network or a command to supply electric power from said electric-power network to said electric-power accumulation battery.

* * * * *